United States Patent
Ohnishi

(10) Patent No.: US 10,877,789 B2
(45) Date of Patent: Dec. 29, 2020

(54) MIGRATING VMS BASED ON ELECTRICITY COSTS OF A PLURALITY OF DATA CENTERS AND RESOURCE LOAD INDEX, AND LIFETIME OF A PLURALITY OF VMS

(71) Applicant: FUJITSU LIMITED, Kawasaki-shi, Kanagawa (JP)

(72) Inventor: Naoto Ohnishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 15/666,717

(22) Filed: Aug. 2, 2017

(65) Prior Publication Data
US 2018/0052704 A1 Feb. 22, 2018

(30) Foreign Application Priority Data

Aug. 18, 2016 (JP) .................................. 2016-160895

(51) Int. Cl.
*G06F 9/455* (2018.01)
*H04L 29/08* (2006.01)

(52) U.S. Cl.
CPC .......... *G06F 9/45558* (2013.01); *H04L 67/10* (2013.01); *G06F 2009/4557* (2013.01); *G06F 2009/45591* (2013.01); *G06F 2009/45595* (2013.01)

(58) Field of Classification Search
CPC ... G06F 2009/4557; G06F 2009/45591; G06F 2009/45595; G06F 9/45558; H04L 67/10
See application file for complete search history.

(56) References Cited

U.S. PATENT DOCUMENTS

| 6,393,458 B1* | 5/2002 | Gigliotti | G06F 9/505 707/999.01 |
| 2008/0104605 A1* | 5/2008 | Steinder | G06F 9/5033 718/104 |
| 2009/0187775 A1 | 7/2009 | Ishikawa | |
| 2009/0293022 A1* | 11/2009 | Fries | G06F 1/206 716/132 |
| 2011/0022861 A1* | 1/2011 | Agneeswaran | G06F 1/3203 713/310 |

(Continued)

FOREIGN PATENT DOCUMENTS

| JP | 2009-169858 | 7/2009 |
| JP | 2011-76470 | 4/2011 |

(Continued)

OTHER PUBLICATIONS

Japanese Office action dated Apr. 7, 2020, issued in corresponding Japanese Patent Application No. 2016-160895.

*Primary Examiner* — Jorge A Chu Joy-Davila
(74) *Attorney, Agent, or Firm* — Xsensus LLP

(57) ABSTRACT

An information processing apparatus includes a memory and a processor coupled to the memory. The processor is configured to collect charge information on electric power for running a virtual machine in respective cloud services provided by respective data centers located in different regions. The processor is configured to obtain operation information of respective first virtual machines running in the cloud services. The processor is configured to generate a migration plan of migrating the first virtual machines on basis of the charge information and the operation information.

10 Claims, 23 Drawing Sheets

(56) References Cited

U.S. PATENT DOCUMENTS

| | | | |
|---|---|---|---|
| 2011/0282982 A1* | 11/2011 | Jain | G06F 9/5094 709/223 |
| 2012/0240113 A1* | 9/2012 | Hur | G06F 9/45558 718/1 |
| 2013/0111492 A1 | 5/2013 | Nojiri et al. | |
| 2014/0165063 A1* | 6/2014 | Shiva | G06F 9/45533 718/1 |
| 2014/0380069 A1* | 12/2014 | Berke | G06F 1/32 713/320 |
| 2016/0094417 A1* | 3/2016 | Bonagiri | H04L 41/5054 709/226 |
| 2017/0109183 A1* | 4/2017 | Cropper | G06F 1/3234 |
| 2017/0155560 A1* | 6/2017 | Lee | H04L 41/0896 |

FOREIGN PATENT DOCUMENTS

| | | |
|---|---|---|
| JP | 2011-243119 | 12/2011 |
| JP | 2013-92951 | 5/2013 |

\* cited by examiner

| SITE INFORMATION | | CONTRACTED POWER COMPANY INFORMATION | | COUNTRY INFORMATION | |
|---|---|---|---|---|---|
| SITE CODE | SITE NAME | POWER COMPANY CODE | CONTRACTED POWER (kWh) | REGION | UTC OFFSET |
| DC001 | HOKKAIDO DC | P05 | 1500 | JP | 9 |
| DC002 | TATEBAYASHI DC | P01 | 3000 | JP | 9 |
| DC003 | TOYAMA DC | P04 | 1000 | JP | 9 |
| DC004 | GIFU DC | P04 | 1000 | JP | 9 |
| DC005 | AKASHI DC | P02 | 3000 | JP | 9 |
| DC006 | OKINAWA DC | P03 | 800 | JP | 9 |

| COUNTRY CODE | POWER COMPANY CODE | POWER COMPANY NAME | BASIC UNIT PRICE (PER kV) | METERED RATE (PER kWh) | | | SEASONAL CHARGE | | |
|---|---|---|---|---|---|---|---|---|---|
| | | | | PEAK TIME (13 TO 16) | DAYTIME (08 TO 22) | NIGHTTIME (22 TO 08) | SUMMER CHARGE | | |
| | | | | | | | START | END | CHARGE (PER kW) |
| JP | P01 | A POWER | 1522.80 | 16.87 | 15.09 | 11.85 | JULY 1 | SEPTEMBER 30 | 16.00 |
| JP | P02 | B POWER | 1863.00 | 20.73 | 16.08 | 13.08 | JULY 1 | SEPTEMBER 30 | 17.50 |
| JP | P03 | C POWER | 1981.80 | 17.22 | 13.20 | 12.11 | JULY 1 | SEPTEMBER 30 | 19.00 |
| JP | P04 | AB POWER | 1830.86 | 17.07 | 14.66 | 13.41 | JULY 1 | SEPTEMBER 30 | 16.00 |
| JP | P05 | AA POWER | 1879.20 | 17.84 | 17.84 | 13.85 | JULY 1 | SEPTEMBER 30 | 15.00 |

(UNIT IS YEN, TO TWO DECIMAL PLACES)

FIG. 5 35

| SITE CODE | TODAY'S POWER USAGE (kWh) | NIGHTTIME (00 TO 08) | DAYTIME (08 TO 13) | PEAK TIME (13 TO 16) | DAYTIME (16 TO 22) | NIGHTTIME (22 TO 24) | SURPLUS POWER | CONTRACTED POWER |
|---|---|---|---|---|---|---|---|---|
| DC001 | 1,370.00 | 200.00 | 150.00 | 800.00 | 180.00 | 40.00 | 130.00 | 1,500.00 |
| DC002 | 2,470.00 | 800.00 | 500.00 | 370.00 | 600.00 | 200.00 | 530.00 | 3,000.00 |
| DC003 | 540.00 | 160.00 | 100.00 | 120.00 | 120.00 | 40.00 | 460.00 | 1,000.00 |
| DC004 | 750.00 | 240.00 | 150.00 | 120.00 | 180.00 | 60.00 | 250.00 | 1,000.00 |
| DC005 | 2,240.00 | 720.00 | 450.00 | 350.00 | 540.00 | 180.00 | 760.00 | 3,000.00 |
| DC006 | 730.00 | 200.00 | 150.00 | 100.00 | 220.00 | 60.00 | 70.00 | 800.00 |

FIG. 6

| SITE CODE | DATE YYYYMMDD | 0 (00/TO 01) | 1 (01/TO 02) | 2 (02/TO 03) | 3 (03/TO 04) | 4 (04/TO 05) | 5 (05/TO 06) | 6 (06/TO 07) | 7 (07/TO 08) | ... | 18 (18/TO 19) | 19 (19/TO 20) | 20 (20/TO 21) | 21 (21/TO 22) | 22 (22/TO 23) | 23 (23/TO 24) | POWER USAGE (kWh) |
|---|---|---|---|---|---|---|---|---|---|---|---|---|---|---|---|---|---|
| DC001 | 20150801 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1295.00 |
| DC001 | 20150802 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1355.00 |
| DC001 | 20150803 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1335.00 |
| DC001 | 20150804 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1365.00 |
| DC001 | 20150805 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1370.00 |
| DC001 | 20150806 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1370.00 |
| DC001 | 20150807 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1360.00 |
| DC001 | 20150808 | 20.00 | 35.00 | 20.00 | 20.00 | 20.00 | 20.00 | 20.00 | 20.00 | ... | 20.00 | 20.00 | 20.00 | 20.00 | 20.00 | 20.00 | 495.00 |
| DC001 | 20150809 | 20.00 | 35.00 | 20.00 | 20.00 | 20.00 | 20.00 | 20.00 | 20.00 | ... | 20.00 | 20.00 | 20.00 | 20.00 | 20.00 | 20.00 | 495.00 |
| DC001 | 20150810 | 20.00 | 35.00 | 35.00 | 20.00 | 20.00 | 20.00 | 20.00 | 60.00 | ... | 30.00 | 30.00 | 30.00 | 30.00 | 20.00 | 20.00 | 1380.00 |

| VM GUEST NAME | DEPLOYMENT DATE yy/mm/dd | LIFETIME (ACCUMULATION) min | OPERATION TIME (ACCUMULATION) min | vCPU (GHz) | vCPU (PIECES) | MEMORY (GB) |
|---|---|---|---|---|---|---|
| VM001 | 2015/06/15 | 371520.00 | 124320.00 | 2.00 | 2.00 | 16.00 |
| VM002 | 2015/12/5 | 167040.00 | 41280.00 | 2.00 | 2.00 | 8.00 |
| VM003 | 2015/12/15 | 109440.00 | 41807.00 | 2.00 | 4.00 | 16.00 |
| VM004 | 2016/1/15 | 64800.00 | 18900.00 | 2.00 | 2.00 | 8.00 |
| VM005 | 2016/1/20 | 41771.00 | 41771.00 | 1.00 | 1.00 | 4.00 |
| VM006 | 2016/2/15 | 200.00 | 9120.00 | 2.00 | 2.00 | 8.00 |

| SITE CODE | VM GUEST NAME | LIFETIME (ACCUMULATION) min | OPERATION TIME (ACCUMULATION) min | vCPU (GHz) | vCPU (PIECES) | MEMORY (GB) |
|---|---|---|---|---|---|---|
| DC001 | VM001 | 371520.00 | 124320.00 | 2.00 | 2.00 | 16.00 |
| DC002 | VM002 | 167040.00 | 41280.00 | 2.00 | 2.00 | 8.00 |
| DC003 | VM003 | 109440.00 | 41807.00 | 2.00 | 4.00 | 16.00 |
| DC004 | VM004 | 64800.00 | 18900.00 | 2.00 | 2.00 | 8.00 |
| DC005 | VM005 | 41771.00 | 41771.00 | 1.00 | 1.00 | 4.00 |
| DC006 | VM006 | 200.00 | 9120.00 | 2.00 | 2.00 | 8.00 |

FIG. 8

| SITE CODE | TOTAL AMOUNT OF RESOURCES | | | AMOUNT OF FREE RESOURCES | | | AMOUNT OF RESOURCES NOT TO BE MIGRATED | | | AMOUNT OF SUBSTITUTABLE RESOURCES | | |
|---|---|---|---|---|---|---|---|---|---|---|---|---|
| | vCPU (GHz) | vCPU (PIECES) | MEMORY (GB) | vCPU (GHz) | vCPU (PIECES) | MEMORY (GB) | vCPU (GHz) | vCPU (PIECES) | MEMORY (GB) | vCPU (GHz) | vCPU (PIECES) | MEMORY (GB) |
| DC001 | 10 | 10 | 10 | 3 | 3 | 3 | 1 | 1 | 1 | 6 | 6 | 6 |
| DC002 | : | : | : | : | : | : | : | : | : | : | : | : |
| DC003 | : | : | : | : | : | : | : | : | : | : | : | : |
| DC004 | : | : | : | : | : | : | : | : | : | : | : | : |
| DC005 | : | : | : | : | : | : | : | : | : | : | : | : |
| DC006 | : | : | : | : | : | : | : | : | : | : | : | : |

| REGION NAME | ZONE NAME | VM GUEST NAME | DEPLOYMENT DATE yy/mm/dd | LIFETIME (ACCUMULATION) min | OPERATION TIME (ACCUMULATION) min | vCPU (GHz) | vCPU (PIECES) | MEMORY (GB) | RESOURCE LOAD INDEX |
|---|---|---|---|---|---|---|---|---|---|
| SA-1 | SA-N1 | VM001 | 2015/06/15 | 371520.00 | 124320.00 | 2.00 | 2.00 | 16.00 | 64.00 |
| SA-1 | SA-N1 | VM002 | 2015/12/5 | 167040.00 | 41280.00 | 2.00 | 2.00 | 8.00 | 32.00 |
| SA-1 | SA-N1 | VM003 | 2015/12/15 | 109440.00 | 41807.00 | 2.00 | 4.00 | 16.00 | 128.00 |
| SA-1 | SA-S1 | VM011 | 2016/1/15 | 64800.00 | 18900.00 | 2.00 | 2.00 | 8.00 | 32.00 |
| SA-1 | SA-S1 | VM012 | 2016/1/20 | 41771.00 | 41771.00 | 1.00 | 1.00 | 4.00 | 4.00 |
| SA-1 | SA-S1 | VM015 | 2016/2/15 | 200.00 | 9120.00 | 2.00 | 2.00 | 8.00 | 32.00 |

| SITE CODE | FORECAST POWER USAGE (kWh) | NIGHTTIME (00 TO 08) | DAYTIME (08 TO 13) | PEAK TIME (13 TO 16) | DAYTIME (16 TO 22) | NIGHTTIME (22 TO 24) | SURPLUS POWER | CONTRACTED POWER | SUBSTITUTABLE POWER |
|---|---|---|---|---|---|---|---|---|---|
| DC001 | 1,370.00 | 200.00 | 150.00 | 800.00 | 180.00 | 40.00 | 130.00 | 1,500.00 | 130.00 |
| DC002 | 2,470.00 | 800.00 | 500.00 | 370.00 | 600.00 | 200.00 | 530.00 | 3,000.00 | 530.00 |
| DC003 | 540.00 | 160.00 | 100.00 | 120.00 | 120.00 | 40.00 | 460.00 | 1,000.00 | 400.00 |
| DC004 | 750.00 | 240.00 | 150.00 | 120.00 | 180.00 | 60.00 | 250.00 | 1,000.00 | 200.00 |
| DC005 | 2,240.00 | 720.00 | 450.00 | 350.00 | 540.00 | 180.00 | 760.00 | 3,000.00 | 760.00 |
| DC006 | 730.00 | 200.00 | 150.00 | 100.00 | 220.00 | 60.00 | 70.00 | 800.00 | 70.00 |

FIG. 11

| SITE CODE | DESTINATION | LATENCY MEASUREMENT RESULT (msec) | | | | | UTC MARGIN | ORDER |
|---|---|---|---|---|---|---|---|---|
| | | MIDNIGHT (00 TO 08) | MORNING (08 TO 12) | AFTERNOON (12 TO 17) | EVENING (17 TO 22) | MIDNIGHT (22 TO 24) | | |
| DC001 | DC001 | 10.00 | 10.00 | 10.00 | 10.00 | 10.00 | 9.00 | 5 |
| DC001 | DC002 | 5.00 | 5.00 | 5.00 | 5.00 | 5.00 | 5.00 | 3 |
| DC001 | DC003 | 20.00 | 20.00 | 20.00 | 20.00 | 10.00 | 4.00 | 6 |
| DC001 | DC004 | 10.00 | 10.00 | 10.00 | 10.00 | 10.00 | 3.00 | 4 |
| DC001 | DC005 | 1.00 | 1.00 | 1.00 | 1.00 | 1.00 | -1.00 | 1 |
| DC001 | DC006 | 1.00 | 1.00 | 1.00 | 1.00 | 1.00 | -2.00 | 2 |

FIG. 12

| SITE CODE | BAND SPECIFICATIONS | | |
|---|---|---|---|
| | CONTRACTED BAND (Gbps) | USE BAND (Gbps) | MAXIMUM USE BAND (Gbps) |
| DC001 | 100 | 70 | 90 |
| DC002 | ... | ... | ... |
| DC003 | ... | ... | ... |
| DC004 | ... | ... | ... |
| DC005 | ... | ... | ... |
| DC006 | ... | ... | ... |

FIG. 13

| MIGRATION TARGET VM ||| MIGRATION DESTINATION DC ||||  |
|---|---|---|---|---|---|---|---|
| REGION NAME | ZONE NAME | SITE CODE | VM GUEST NAME | REGION NAME | ZONE NAME | SITE CODE | MIGRATION SCHEDULED DATE |
| SA-1 | SA-N1 | DC001 | VM001 | NA-N1 | NA-W1 | DCN01 | 2016/8/15 |
| SA-1 | SA-N1 | DC001 | VM002 | NA-N1 | NA-W1 | DCN01 | 2016/8/15 |
| SA-1 | SA-N1 | DC001 | VM003 | NA-N1 | NA-W1 | DCN01 | 2016/8/15 |
| SA-1 | SA-S1 | DC011 | VM011 | NA-N1 | NA-E1 | DCN11 | 2016/8/15 |
| SA-1 | SA-S1 | DC011 | VM012 | NA-N1 | NA-E1 | DCN11 | 2016/8/15 |
| SA-1 | SA-S1 | DC011 | VM015 | NA-N1 | NA-E1 | DCN11 | 2016/8/15 |

43

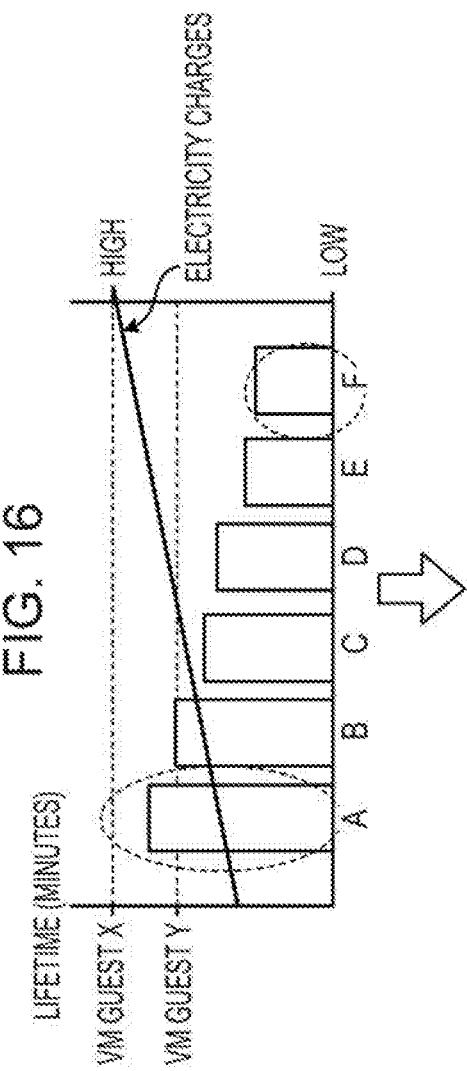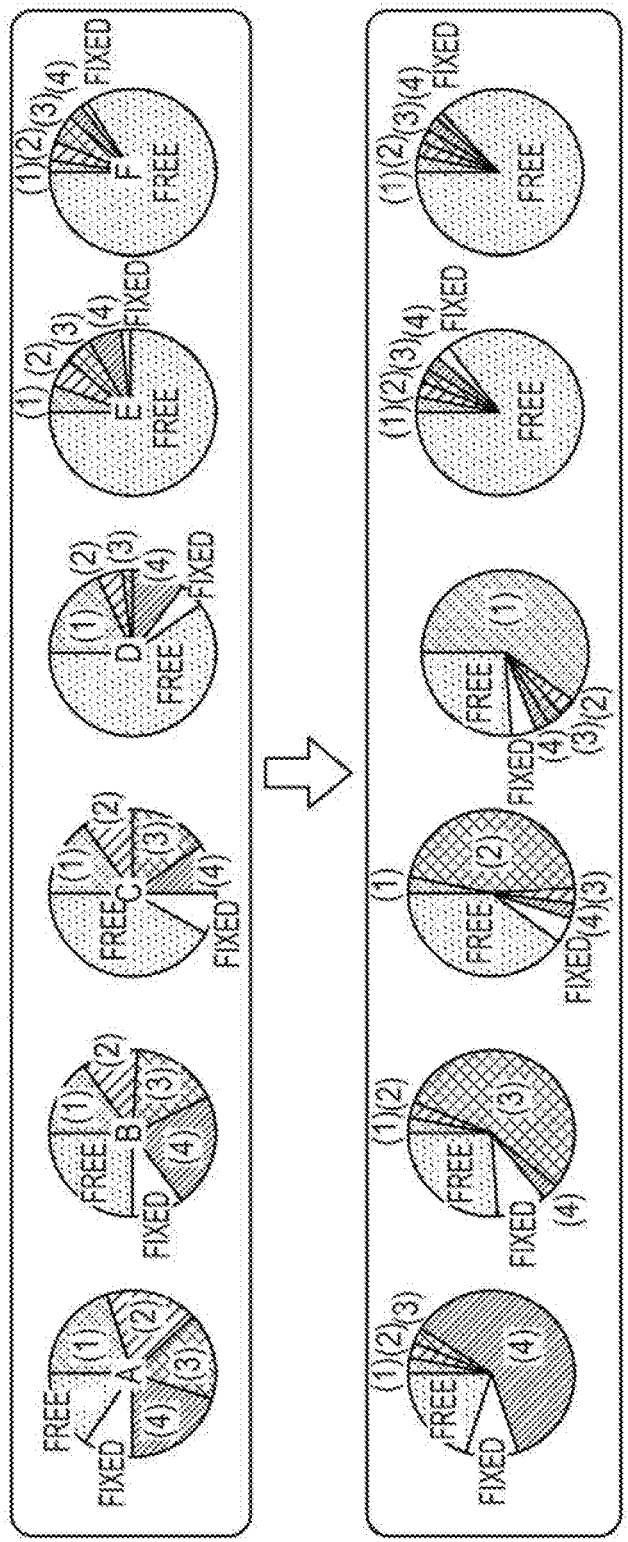
FIG. 16

MIGRATING VMS BASED ON ELECTRICITY COSTS OF A PLURALITY OF DATA CENTERS AND RESOURCE LOAD INDEX, AND LIFETIME OF A PLURALITY OF VMS

CROSS-REFERENCE TO RELATED APPLICATION

This application is based upon and claims the benefit of priority of the prior Japanese Patent Application No. 2016-160895, filed on Aug. 18, 2016, the entire contents of which are incorporated herein by reference.

FIELD

The embodiments discussed herein are related to an information processing apparatus and an information processing system.

BACKGROUND

To date, cloud services (hereinafter sometimes abbreviated as clouds) that use cloud computing have been known. In the cloud computing, a plurality of virtual machines (VMs) are activated in a data center, and each virtual machine is provided to a company or the like. In recent years, a wide-area cloud has also been widespread, in which data centers are disposed in different cities or different countries and narrow-area clouds provided by the respective data centers are linked.

In such a cloud, a technique is known in which the resources used by virtual machines in a narrow-area cloud are summed up and an optimal VM host and storage are assigned. Also, a technique is known in which load information of the resources used by the virtual machines in a narrow-area cloud is accumulated, loads for respective VM hosts are compared with each other, and a virtual machine is migrated for load leveling.

Related techniques are disclosed in, for example, Japanese Laid-open Patent Publication No. 2011-243119, Japanese Laid-open Patent Publication No. 2009-169858, Japanese Laid-open Patent Publication No. 2013-92951, and Japanese Laid-open Patent Publication No. 2011-76470.

With the above-described techniques, disproportion in power usage arises in a wide-area cloud, that is to say, in the entire cloud. Accordingly, if virtual machines are concentrated in a narrow-area cloud having high electricity charges, the fee of the entire cloud becomes high, and thus the cost burden on companies and the like using the virtual machines is set to high. On the other hand, if virtual machines are concentrated in a narrow-area cloud having low electricity charges, the fee of the entire cloud becomes low, and thus the cost burden on companies and the like using the virtual machines is set to low. In this manner, even in a case of providing the same virtual machine to companies and the like, the usage fee sometimes differs due to the disproportion in power usage of the entire cloud, which causes deterioration in the service level.

SUMMARY

According to an aspect of the present invention, provided is an information processing apparatus including a memory and a processor coupled to the memory. The processor is configured to collect charge information on electric power for running a virtual machine in respective cloud services provided by respective data centers located in different regions. The processor is configured to obtain operation information of respective first virtual machines running in the cloud services. The processor is configured to generate a migration plan of migrating the first virtual machines on basis of the charge information and the operation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a site information DB;

FIG. 4 is a diagram illustrating an example of information stored in a power company DB;

FIG. 5 is a diagram illustrating an example of information stored in a power use history DB;

FIG. 6 is a diagram illustrating an example of information stored in a power use state DB;

FIG. 8 is a diagram illustrating an example of information stored in a DC resource management DB;

FIG. 9 is a diagram illustrating an example of information stored in an environmental load DB;

FIG. 10 is a diagram illustrating an example of information stored in a power demand forecast DB;

FIG. 11 is a diagram illustrating an example of information stored in a latency DB;

FIG. 12 is a diagram illustrating an example of information stored in a band management DB;

FIG. 13 is a diagram illustrating an example of information stored in a migration plan DB;

FIG. 16 is a diagram illustrating a migration plan of a VM guest in consideration of electricity charges;

DESCRIPTION OF EMBODIMENTS

In the following, detailed descriptions will be given of an information processing apparatus and an information processing system according to embodiments with reference to the drawings. This disclosure is not limited to these embodiments.

First Embodiment

Figure 1:
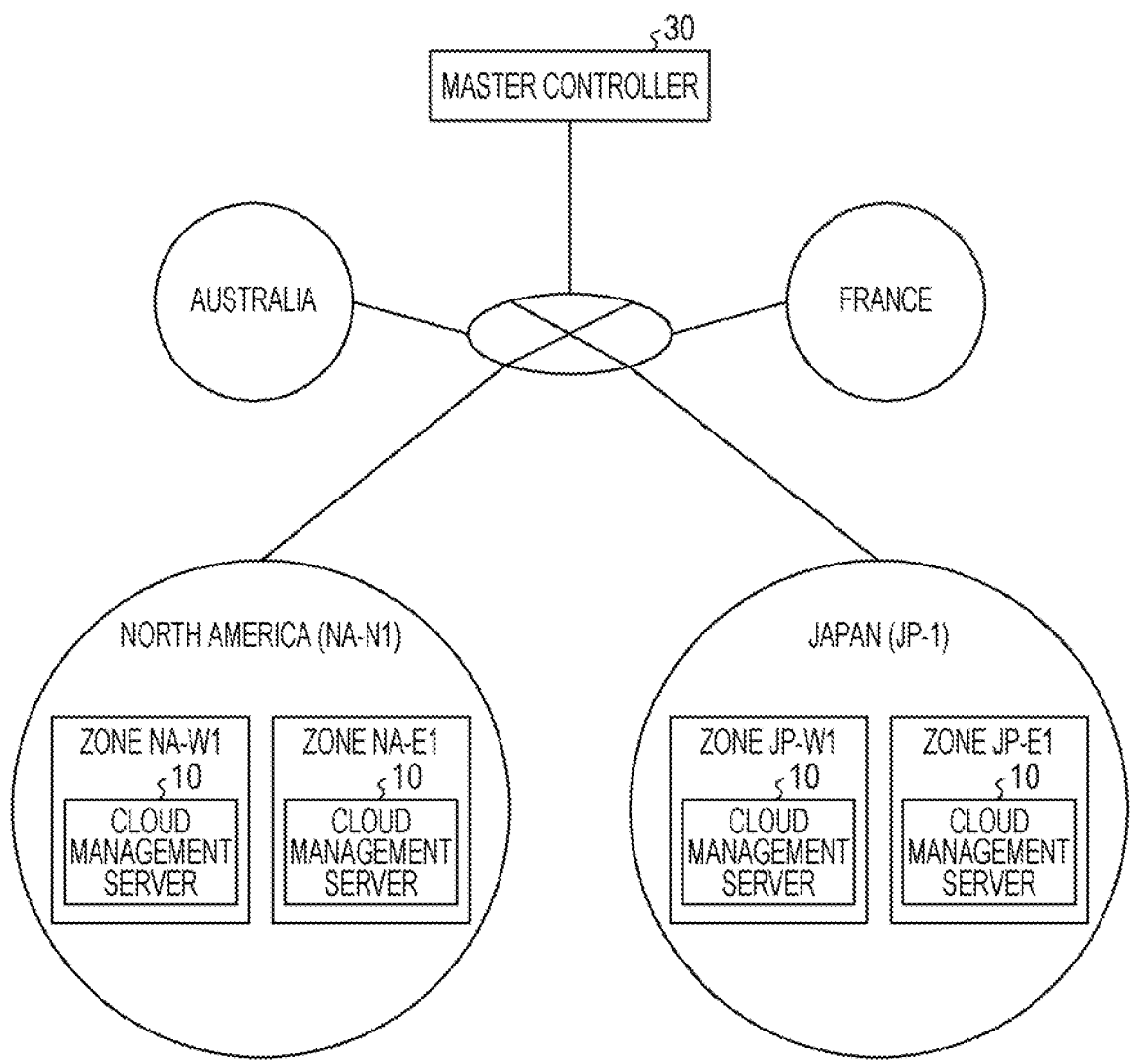
FIG. 1 is a diagram illustrating an exemplary configuration of a system according to a first embodiment.

FIG. 1 is a diagram illustrating an exemplary configuration of an entire system according to a first embodiment. As illustrated in FIG. 1, this system includes clouds provided by data centers located in different countries and a master controller 30 which is an example of a server that conducts across-the-board management of the respective clouds. The clouds and the master controller 30 are communicably coupled to each other. FIG. 1 illustrates an example in which data centers located in respective countries of, for example, Japan, North America, Australia, and France provide cloud services (clouds), and the master controller 30 installed in Japan conducts the across-the-board management. In this embodiment, a cloud service provided in each zone is sometimes described as a narrow-area cloud, and a cloud service including a plurality of narrow-area clouds as a whole is sometimes described as a wide-area cloud.

Here, a region name that distinguishes a country, a city, or the like as a region is assigned to each country. For example, "JP-1" is assigned to Japan as a region name, and "NA-N1" is assigned to North America. Each country has zones into which a plurality of data centers are grouped in consideration of geographical conditions or the like.

For example, in the case of Japan, the region includes a zone "JP-W1" into which data centers DC001 and DC002 are grouped and a zone "JP-E1" into which data centers DC011 and DC012 are grouped. Accordingly, in the zone "JP-W1", a cloud environment is provided by the data centers DC001 and DC002, and in the zone "JP-E1", a cloud environment is provided by the data centers DC011 and DC012. It is assumed that data centers within the same zone have the same geographical conditions, and thus have the same charge system. One cloud environment may be provided by one data center or by a plurality of data centers in cooperation.

A cloud management server 10 is installed in each zone as an example of a server that manages each data center, that is to say, each cloud environment. For example, in the case of Japan, the cloud management server 10 is installed in each of the zone "JP-W1" and the zone "JP-E1". The description has been given here using Japan as an example. However, each other country has a similar configuration. Each cloud management server in each country has the same functions, and thus a description will be given regarding the cloud management server 10.

In such a system, each cloud management server 10 inquires of the master controller 30 as to a deployment request of deploying a virtual machine (hereinafter sometimes referred to as a VM or VM guest) in each cloud. Each cloud management server 10 activates a VM guest or stops a VM guest depending on a response result of the inquiry using the environment of the narrow-area cloud managed by the cloud management server 10 and the environment of the wide-area cloud. Each cloud management server 10 periodically collects and manages information regarding the resources of the narrow-area cloud managed by the cloud management server 10, information regarding the VM guests operating in the narrow-area cloud, and the like.

The master controller 30 collects the information regarding the resources of the narrow-area clouds from the respective cloud management servers 10 and the information regarding the VM guests. The master controller 30 collects the charge information regarding the power when a VM guest is used in each narrow-area cloud regarding the narrow-area clouds provided by the respective data centers located in the different regions. The master controller 30 obtains, for each VM guest operating in each narrow-area cloud, an accumulated time from the deployment of each VM guest in the respective cloud. The master controller 30 then generates a migration plan of migrating each VM guest on the basis of the charge information of each narrow-area cloud and the accumulated time of each VM guest.

For example, the master controller 30 generates a migration plan for migrating a VM guest having a relatively long operation time to a cloud having relatively low electricity charges and a migration plan for migrating a VM guest having a relatively short operation time to a cloud having relatively high electricity charges, and distributes the migration plan to each cloud management server 10. Each cloud management server 10 then carries out the distributed migration plan at a specified timing or at any timing to migrate each VM guest to the planned cloud. As a result, the master controller 30 may reduce disproportion in power usage from the viewpoint of the overall wide-area cloud, and reduce the fee for power usage of the overall wide-area cloud.

Figure 2:
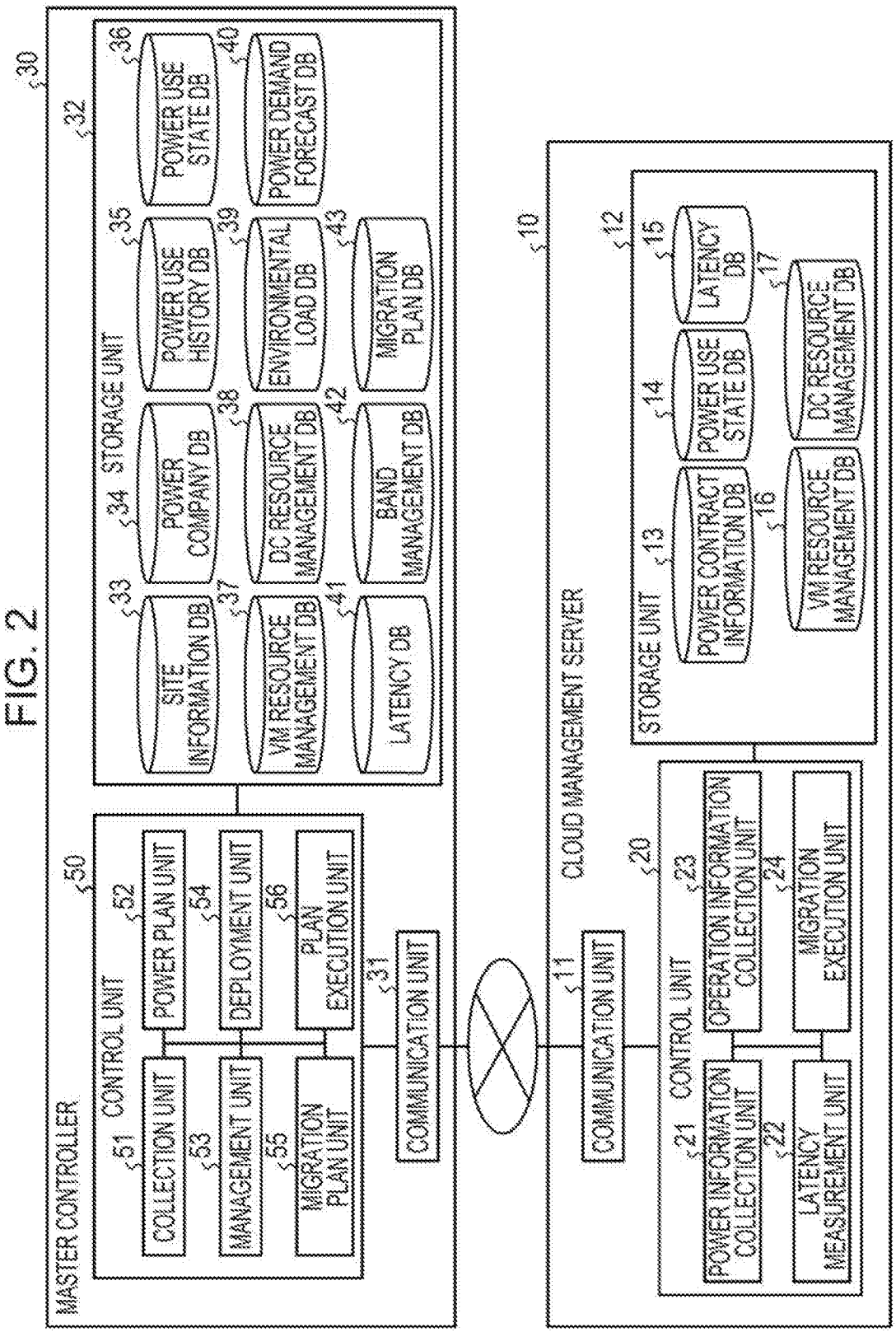
FIG. 2 is a diagram illustrating an exemplary functional configuration of the system according to the first embodiment.

Next, a description will be given of functional configurations of the cloud management server 10 and the master controller 30 with reference to FIG. 2. FIG. 2 is a diagram illustrating a functional configuration of the system according to the first embodiment. Each cloud management server in each narrow-area cloud has the same configuration, and thus a description will be given here regarding the cloud management server 10.

As illustrated in FIG. 2, the cloud management server 10 includes a communication unit 11, a storage unit 12, and a control unit 20.

The communication unit 11 is a processing unit that establishes communications with another cloud management server 10, respective VM guests, and the master controller 30 to transmit and receive various kinds of data or the like. For example, the communication unit 11 receives, from the respective VM guests, information about resources such as a processor, a memory, and the like that are used by the respective VM guests, and receives various requests, a migration plan, or the like from the master controller 30. The communication unit 11 transmits a migration instruction to the respective VM guests, and transmits various kinds of information such as the resource information of the respective VM guest and the like to the master controller 30.

The storage unit 12 is an example of a storage device that stores therein programs executed by the control unit 20, data, and the like, and is, for example, a memory, a hard disk, or the like. The storage unit 12 stores therein a power contract information database (DB) 13, a power use state DB 14, a latency DB 15, a VM resource management DB 16, and a DC resource management DB 17. The information stored in each DB is aggregated in the master controller 30, and thus a detailed description thereof will be given in the description of the functional configuration of the master controller 30.

The power contract information DB 13 is a database that stores information regarding the electricity charges contracted by the data centers that provide cloud services under the control of the cloud management server 10. For example, the power contract information DB 13 stores a power company name, per-kWh charge (metered rate), extra charge such as nighttime charge and summer charge, and the like.

The power use state DB 14 is a database that stores information regarding the power energy consumed by the respective data centers under the control of the cloud management server 10. For example, the power use state DB 14 stores total power usage per day, nighttime power usage, daytime power usage, peak-time power usage, and the like. The power use state DB 14 may store power usage for each day, power usage for each month, and the like.

The latency DB 15 is a database that stores information regarding the latencies between the narrow-area clouds. Specifically, the latency DB 15 stores the latencies between each of the data centers (DC001 and DC002) managed by the cloud management server 10 and the data centers in each country. The latency DB 15 may store network information such as the bands contracted by the respective data centers managed by the cloud management server 10 or the like.

The VM resource management DB 16 is a database that stores information regarding each VM guest operating in each data center managed by the cloud management server 10. For example, the VM resource management DB 16 manages running VM guests for each data center. The VM resource management DB 16 also stores resource information such as lifetime, operation time, in-use processor information (vCPU (Hz)), the number of in-use processors (vCPU (the number of pieces)), an in-use memory capacity (memory (GB)), and the like for each VM guest.

The DC resource management DB 17 is a database that stores resource information of each data center managed by the cloud management server 10. For example, the DC resource management DB 17 stores the total amount of resources available for assigning to the respective VM guests and the amount of resources that are actually used among the total amount of resources, and the like for each data center.

The control unit 20 is a processing unit that controls the entire cloud management server 10 and, for example, a processor or the like. The control unit 20 includes a power information collection unit 21, a latency measurement unit 22, an operation information collection unit 23, and a migration execution unit 24. The power information collection unit 21, the latency measurement unit 22, the operation information collection unit 23, and the migration execution unit 24 are examples of an electronic circuit, such as a processor or the like, or examples of a process executed by a processor or the like.

The power information collection unit 21 is a processing unit that collects information regarding the contracted electricity charges, charge information regarding the used electricity, and the like for the respective data centers managed by the cloud management server 10 when an instruction is received from the master controller 30 or at a periodical timing.

For example, the power information collection unit 21 receives the information regarding the contracted electricity charges from an administrator or the like and stores the information in the power contract information DB 13. Also, the power information collection unit 21 collects information regarding power usage per unit time from each data center, and generates each piece of information to be stored in the power use state DB 14 on the basis of the collected information regarding power usage and stores the generated information in the power use state DB 14. Also, the power information collection unit 21 transmits the information stored in the power contract information DB 13 and the information stored in the power use state DB 14 to the master controller 30 in response to a request from the master controller 30.

The latency measurement unit 22 is a processing unit that measures latency between data centers managed by the cloud management server 10. For example, the latency measurement unit 22 measures latency between a data center (DC001) and another data center by a general known method, and stores the latency in the latency DB 15. Also, the latency measurement unit 22 transmits the information stored in the latency DB 15 to the master controller 30 in response to a request from the master controller 30.

The operation information collection unit 23 is a processing unit that collects information regarding VMs that run in the cloud under the control of the control unit 20. For example, the operation information collection unit 23 periodically collects "vCPU (Hz)" indicating the specifications of the assigned virtual processor, "vCPU (the number of pieces)" indicating the assigned number of virtual processors, and "memory (GB)" indicating the capacity of the assigned virtual memory, for the VM guest operating in the data center DC001, and stores them in the VM resource management DB 16. Further, the operation information collection unit 23 collects the date on which the cloud is deployed, a lifetime (minutes) which is the accumulated time since the deployment, an operation time (minutes) which is the accumulated actual operation time, and the like for each VM, and stores them in the VM resource management DB 16. Also, the operation information collection unit 23 transmits the information stored in the VM resource management DB 16 to the master controller 30 in response to a request from the master controller 30.

Further, the operation information collection unit 23 collects information regarding the resources of the data centers under the control of the control unit 20. For example, the operation information collection unit 23 stores the total amount of available resources and the amount of used resources used by the VM guests, which are collected periodically, in the DC resource management DB 17. Also, the operation information collection unit 23 subtracts the amount of the used resources from the total amount of available resources to calculate the amount of free resources and stores the amount of the free resources in the DC resource management DB 17. Also, the operation information collection unit 23 transmits the information stored in the DC resource management DB 17 to the master controller 30 in response to a request from the master controller 30.

As illustrated in FIG. 2, the master controller 30 includes a communication unit 31, a storage unit 32, and a control unit 50.

The communication unit 31 is a processing unit that controls communications with each cloud management server 10. For example, the communication unit 31 receives the power information, the operation information of VM guests, and the resource information of the data center from each cloud management server 10. Also, the communication unit 31 transmits various requests, a migration plan and a migration instruction of a VM guest, and the like to each cloud management server 10.

The storage unit 32 is an example of a storage device that stores therein programs executed by the control unit 50, data, and the like, and is, for example, a memory, a hard disk, or the like. The storage unit 32 stores a site information DB 33, a power company DB 34, a power use history DB 35, a power use state DB 36, a VM resource management DB 37, a DC resource management DB 38, an environmental load DB 39, a power demand forecast DB 40, a latency DB 41, a band management DB 42, and a migration plan DB 43.

The site information DB 33 is a database that stores information regarding the sites where the data centers providing clouds are located. FIG. 3 is a diagram illustrating an example of the information stored in the site information DB 33. As illustrated in FIG. 3, the site information DB 33 stores "site information", "contracted power company information", and "country information" in association with one another. The information to be stored here may be generated by using the power contract information or the like received from the cloud management server 10, or may be specified by an administrator in advance.

The item "site information" stored here is information indicating the location of the data center, and "site code" and "site name" are specified. The item "site code" is an identifier that identifies the site, and the item "site name" is the name of the site. The item "contracted power company information" is information of a power company that provides the site with power, and "power company code" and "contracted power (kWh)" are specified. The item "power company code" is an identifier that identifies the power company, and the item "contracted power (kWh)" is a power value contracted with the site. The item "country information" is information that identifies a country in which the site, that is to say, the data center is located, and "region" and the "UTC offset" are specified. "UTC" is an abbreviation for the Universal Time Coordinated. The item "region" is an identifier that identifies the country. For example, "JP" is specified in the case of Japan, "US" is specified in the case of the United States of America (USA), and the like. "UTC offset" indicates a time difference with the UTC.

In the case of FIG. 3, a record having the site code "DC001" and the site name "Hokkaido DC" indicates that the site is located in the region "Japan (JP)" having a UTC time difference of "9 hours", and the site has a power contract of "1500 kWh/day" with a power company having the power company code of "P05".

The power company DB 34 stores information regarding a power company that supplies power to the respective data centers. The information to be stored here may be generated by using the power contract information or the like received from the cloud management server 10, or may be specified by an administrator in advance. FIG. 4 is a diagram illustrating an example of the information stored in the power company DB 34. As illustrated in FIG. 4, the power company DB 34 stores "country code", "power company code", "power company name", "basic unit price (per kV)", "metered rate (per kWh)", and "seasonal charge" in association with one another. Here, the unit of the charges is Yen, and the charges are expressed to two decimal places, for example.

The item "country code" stored here is an identifier that identifies a country and is the same as "region" in FIG. 3. The item "power company code" is the same as that in FIG. 3, and the item "power company name" is the name of the power company. The item "basic unit price" is a unit price of power usage per 1 kV. The item "metered rate" indicates the metered rate per 1 kWh and are separately set for "peak time", "daytime", and "nighttime". The item "peak time" indicates the rate from 13:00 to 16:00, "daytime" indicates the rate from 8:00 to 22:00, and "nighttime" indicates the rate from 22:00 to 8:00. A basic price is calculated by basic unit price×contracted power×power factor (discount or additional). If the setting for peak time is not specified, the same rate as that of the daytime is specified. The item "seasonal charge" is specified only during a special period, and is a seasonal charge, for example, "summer charge" and the like. The item "summer charge" is specially applied from the start to the end of the period in place of the metered rate.

The first record in FIG. 4 indicates that the basic unit price of a power company having the power company code "P01" and the power company name "A power", located in Japan is "1522.80 Yen/kV". This power company "A power" charges at a metered rate of "16.87 Yen" per 1 kWh during peak time, "15.09 Yen" per 1 kWh during daytime, and "11.85 Yen" per 1 kWh during nighttime. Further, this power company "A power" charges at a metered rate of "16.00 Yen" per 1 kWh from "July 1" to "September 30" as the summer charge regardless of the time periods.

The power use history DB 35 is a database that stores the power use states per day for each of the data centers. The information to be stored here may be generated by using the power contract information or the like received from the cloud management server 10. FIG. 5 is a diagram illustrating an example of the information stored in the power use history DB 35. As illustrated in FIG. 5, the power use history DB 35 stores "site code", "today's power usage (kWh)", "nighttime (00 to 08)", "daytime (08 to 13)", "peak time (13 to 16)", "daytime (16 to 22)", "nighttime (22 to 24)", "surplus power", and "contracted power" in association with one another.

"Site code" stored here is the same as that in FIG. 3 or the like and "today's power usage" is the total power usage for one day. "nighttime (00 to 08)" is an amount of power usage from 0:00 to 8:00, "daytime (08 to 13)" is an amount of power usage from 8:00 to 13:00, "peak time (13 to 16)" is an amount of power usage from 13:00 to 16:00, "daytime (16 to 22)" is an amount of power usage from 16:00 to 22:00, and "nighttime (22 to 24)" is an amount of power usage from 22:00 to 24:00. "Surplus power" is an unspent power, that is, the remaining power until the contracted power is reached. "Contracted power" is the upper limit value of power usage available for one day.

The first record in FIG. 5 indicates that the data center having the site code "DC001" has contracted power per day of "1500.00 kWh", power usage per one day of "1370.00 kWh", and a surplus of "130.00 kWh". Also, the first record indicates that the data center uses "200.00 kWh" between 0:00 and 8:00, uses "150.00 kWh" between 8:00 and 13:00, uses "800.00 kWh" between 13:00 and 16:00, uses "180.00 kWh" between 16:00 and 22:00, and uses "40.00 kWh" between 22:00 and 24:00. The information stored here may be the average value of data for several days or may be the data of each day.

The power use state DB 36 stores the power usage during each hour of one day for each data center. The information to be stored here may be generated on the basis of information received from the cloud management server 10, or may be specified by an administrator in advance. FIG. 6 is a diagram illustrating an example of the information stored in the power use state DB 36. As illustrated in FIG. 6, the power use state DB 36 stores "site code", "date", "0" to "23" (one-hour time periods), and "power usage (kWh)" in association with one another.

The item "site code" stored here is the same as that in FIG. 3, the item "date" is the date of the power usage data. Each item of "0" to "23" is an amount of power usage for each hour in one day, and the item "power usage" is the total power usage of one day. The example in FIG. 6 indicates the power usage of each time period of each day from "Aug. 1, 2015" to "Aug. 10, 2015" in the data center having the site code "DC001".

Figure 7:
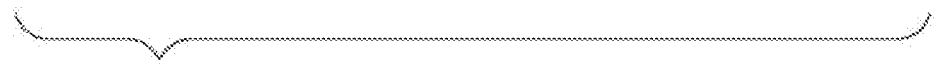
FIG. 7 is a diagram illustrating an example of information stored in a VM resource management DB.

The VM resource management DB 37 is a database that stores information regarding each VM that runs in each cloud. The information to be stored here may be generated on the basis of information received from the cloud management server 10. FIG. 7 is a diagram illustrating an example of the information stored in the VM resource management DB 37. As illustrated in FIG. 7, the VM resource management DB 37 stores a resource management table for each VM guest and a VM resource aggregate table for each DC.

The resource management table for each VM guest manages "VM guest name", "deployment date", "lifetime", "operation time", "vCPU (GHz)", "vCPU (the number of pieces)", and "memory (GB)" in association with one another. "VM guest name" is an identifier that identifies a VM guest, and "deployment date" is the date when the VM guest is deployed in the cloud. "Lifetime" is an accumulated time since the VM guest is deployed up to now, and "operation time" is an accumulated time during which the VM guest is actually operating. The items "vCPU (GHz)", "vCPU (the number of pieces)", and "memory (GB)" are resource information regarding resources used by the VM guest. The item "vCPU (GHz)" is the specifications of the virtual processor used by the VM guest, "vCPU (the number of pieces)" is the number of virtual processors used by the VM guest, and "memory (GB)" is the capacity of the memory used by the VM guest.

The example in FIG. 7 indicates that a VM having the VM guest name "VM001" is deployed in the cloud on Jun. 15, 2015 with the assignment of two 2-GHz virtual processors and a 16-GB memory, 371520 minutes has passed since the deployment, and the VM has been operating for 124320 minutes during the time period.

The VM resource aggregate table for each DC manages "site code", "VM guest name", "lifetime", "operation time", "vCPU (GHz)", "vCPU (the number of pieces)", and "memory (GB)" in association with one another. Each item is described above, and thus detailed description will be omitted. The VM resource aggregate table in FIG. 7 indicates that a VM guest having the VM guest name "VM001" is running in the data center having the site code "DC001".

The DC resource management DB 38 is a database that stores information regarding resources in each data center. The information to be stored here may be generated on the basis of information received from the cloud management server 10. FIG. 8 is a diagram illustrating an example of the information stored in the DC resource management DB 38. As illustrated in FIG. 8, the DC resource management DB 38 stores a resource aggregate table for each DC.

The resource aggregate table for each DC stores use states of the resources and an amount of resources allowed to be used to import a VM guest from another cloud for each data center (DC). Specifically, the resource aggregate table for each DC manages "site code", "total amount of resources", "amount of free resources", "amount of resources not to be migrated", and "amount of substitutable resources". The item "site code" stored here is the same as that in FIG. 3 or the like, and "total amount of resources" is the total amount of resources available to be provided to VM guests by the DC. "Amount of free resources" is an amount of unspent resources in the DC, and "amount of resources not to be migrated" is an amount of resources that are used by VM guests which are not allowed to be migrated to another cloud. "Amount of substitutable resources" is an amount of resources that the data center may use to import (accept) a VM guest, that is, an amount of resources allowed to be used to substitute the imported VM guest. Each amount of resources is expressed by vCPU (GHz), vCPU (the number of pieces), and a memory (GB).

The environmental load DB 39 is a database that stores aggregate information regarding the lifetime, the operation time, and assigned resources for all the VM guests in the cloud. FIG. 9 is a diagram illustrating an example of the information stored in the environmental load DB 39. As illustrated in FIG. 9, the environmental load DB 39 stores "region name", "zone name", "VM guest name", "deployment date", "lifetime", "operation time", "vCPU (GHz)", "vCPU (the number of pieces)", "memory (GB)", and "resource load index" in association with one another. The item "region name" is an identifier that identifies a region, such as a country, a city, or the like, and "zone name" is an identifier that identifies a group of a plurality of data centers grouped in consideration of geographical conditions or the like, "resources load index" is information indicating resource loads on the VM, which is obtained by multiplying "vCPU (GHz)", "vCPU (the number of pieces)", and "the memory (GB)". The other items are described above, and thus the descriptions thereof will be omitted.

The example in FIG. 9 indicates that a VM guest having a VM guest name "VM001" is deployed in a cloud in a zone having a zone name "SA-N1" in a region having a region name "SA-1" on Jun. 15, 2015. Two virtual processors of 2 GHz and a 16-GB memory are assigned to the VM guest "VM001", and the load to migrate the VM guest "VM001" is "64". 371520 minutes have passed since the VM guest "VM001" is deployed in the cloud, and the VM guest has been operating for 124320 minutes.

The power demand forecast DB 40 is a database that stores demand forecast of the power for each time period in the data center and substitutable power. The information to be stored here may be generated on the basis of information received from the cloud management server 10. FIG. 10 is a diagram illustrating an example of the information stored in the power demand forecast DB 40. As illustrated in FIG. 10, the power demand forecast DB 40 stores "site code", "forecast power usage (kWh)", "nighttime (00 to 08)", "daytime (08 to 13)", "peak time (13 to 16)", "daytime (16 to 22)", "nighttime (22 to 24)", "surplus power", "contracted power", and "substitutable power" in association with one another.

The item "site code" stored here is the same as that in FIG. 3 and the like. The item "nighttime (00 to 08)" is power usage expected to be in demand between 0:00 to 8:00, for example, a value equal to or higher than the total value of the power usage of each VM running in the data center (DC001) between 0:00 to 8:00 is set in the item. In the same manner, the item "daytime (08 to 13)" is power usage expected to be in demand between 8:00 and 13:00, the item "peak time (13 to 16)" is power usage expected to be in demand between 13:00 and 16:00, the item "daytime (16 to 22)" is power usage expected to be in demand between 16:00 and 22:00, the item "nighttime (22 to 24)" is power usage expected to be in demand between 22:00 and 24:00. The item "forecast power usage" is the total of the forecast power usage during nighttime (00 to 08), during daytime (08 to 13), during peak time (13 to 16), during daytime (16 to 22), and during nighttime (22 to 24). The item "contracted power" is the upper limit value of the power usage contracted by the data center. The item "surplus power" is a value obtained by subtracting the forecast power usage from the contracted power. The item "substitutable power" is the power energy which may be used by the data center to import a VM guest and which is calculated by the control unit 50 by using the surplus power, the peak-time power usage, and the like.

The first record in FIG. 10 is the power demand forecast for the data center having the site code "DC001", and indicates that forecast power demand during nighttime (00 to 08) is 200 kWh, forecast power demand during daytime (08 to 13) is 150 kWh, forecast power demand during peak time (13 to 16) is 800 kWh, forecast power demand during daytime (16 to 22) is 180 kWh, forecast power demand during nighttime (22 to 24) is 40 kWh, and the total forecast power usage for one day is 1370 kWh. The data center having the site code "DC001" has a contracted power of 1500 kWh, a surplus power of 130 kWh, and a calculated substitutable power of 130 kWh.

The latency DB 41 is a database that stores the latency between the data centers for each data center. Information stored here is, for example, the latency measured by the cloud management server 10 in each data center with respect to a cloud management server 10 located in a data center in another cloud, the latency measured between specific servers in each data center, or the like.

FIG. 11 is a diagram illustrating an example of the information stored in the latency DB 41. As illustrated in FIG. 11, the latency DB 41 stores "site code", "destination", "latency measurement result" and "order" in association with one another. The item "site code" is the same as that in FIG. 3, and the item "destination" is information for identifying a measurement destination of the latency. The item "latency measurement result" manages the latency during "midnight (00 to 08)", during "morning (08 to 12)", during "afternoon (12 to 17)", during "evening (17 to 22)", during "midnight (22 to 24)", and "UTC offset" in association with one another.

The item "midnight (00 to 08)" is the latency measured between 0:00 and 8:00, the item "morning (08 to 12)" is the latency measured between 8:00 and 12:00, the item "afternoon (12 to 17)" is the latency measured between 12:00 and 17:00, the item "evening (17 to 22)" is the latency measured between 17:00 and 22:00, the item "midnight (22 to 24)" is the latency measured between 22:00 and 24:00, and the item "UTC offset" is the same as that in FIG. 3. The item "order" is an order recommended as a migration destination on the basis of the latency, and the smaller the latency, the higher the order.

The example in FIG. 11 indicates the measurement result of the latency between "DC001" and each of the other data centers. The example in FIG. 11 indicates that the migration destination is determined in the order of "DC005", "DC006", "DC002", "DC004", "DC001", and "DC003" in accordance with respective latencies of "DC001" with "DC001" to "DC006". The latencies between "DC001" and "DC005" at midnight (00 to 08), in the morning (08 to 12), in the afternoon (12 to 17), in the evening (17 to 22), and at midnight (22 to 24)" are respectively "1 msec", and the UTC offset is "−1 hour". When the latency is the same, a DC having a smaller UTC offset is given priority.

The band management DB 42 is a database that stores information regarding information on the network contracted by each data center. The information to be stored here may be generated on the basis of information received from the cloud management server 10, or may be specified by an administrator in advance.

FIG. 12 is a diagram illustrating an example of information stored in the band management DB 42. As illustrated in FIG. 12, the band management DB 42 stores "site code", "band specifications ("contracted band (Gbps)", "used band (Gbps)", and "maximum used band (Gbps)")" in association with one another. The item "site code" is the same as that in FIG. 3. The item "contracted band" indicates the bandwidth contracted by a data center, the item "used band" indicates the bandwidth actually used by the data center, the item "maximum used band" indicates the maximum bandwidth used in the past. The example in FIG. 12 indicates that the data center having the site code "DC001" has contracted a band of 100 Gbps, uses 70 Gbps in general, and has used up to 90 Gbps.

The migration plan DB 43 is a database that stores a migration plan of a VM guest, which is generated by the control unit 50 described later. FIG. 13 is a diagram illustrating an example of the information stored in the migration plan DB 43. As illustrated in FIG. 13, the migration plan DB 43 stores "migration target VM", "migration destination DC", and "migration scheduled date" in association with one another.

The item "migration target VM" is information for identifying a VM guest which is to be migrated and which is identified by "region name", "zone name", "site code", and "VM guest name". The item "migration destination DC" is information for identifying a data center to which the VM guest is to be migrated and which is identified by "region name", "zone name", and a "site code". The item "migration scheduled date" is information indicating a schedule of executing migration of the VM. The example in FIG. 13 indicates that there is a plan for migrating a VM guest "VM001" running in the cloud having the site code "DC001", the zone name "SA-N1", and the region name "SA-1" to a cloud (data center) having the site code "DCN01", the zone name "NA-W1", and the region name "NA-N1" on Aug. 15, 2016.

The control unit 50 is a processing unit that controls the entire master controller 30 and is, for example, a processor or the like. The control unit 50 includes a collection unit 51, a power plan unit 52, a management unit 53, a deployment unit 54, a migration plan unit 55, and a plan execution unit 56. The collection unit 51, the power plan unit 52, the management unit 53, the deployment unit 54, the migration plan unit 55, and the plan execution unit 56 are examples of an electronic circuit, such as a processor or the like, or examples of a process or the like.

The collection unit 51 is a processing unit that obtains the power state of the entire cloud. Specifically, the collection unit 51 periodically obtains the contracted power, power use history, power use state of each day, and the like from each data center that forms a narrow-area cloud. For example, the collection unit 51 obtains the information of the contracted power companies from each cloud management server 10 once a month and stores the information in the site information DB 33. In the same manner, the collection unit 51 periodically obtains electricity charges, metered rate, seasonal charge, and the like from the power company in each country, and stores them in the power company DB 34.

Also, the collection unit 51 obtains the power use state from each data center every hour and stores the power state in each hour in the power use state DB 36. When the power use states for one day is collected, the collection unit 51 generates the power use state in one day for each data center and stores it in the power use history DB 35.

The power plan unit 52 is a processing unit that performs a power demand forecast on the basis of the power use state of each data center. Specifically, the power plan unit 52 periodically obtains the current power demand and the past history of each cloud, and plans a power demand among the clouds so as not to exceed the contracted power during the peak time in each cloud and to meet the target amount of reduction. Here, a description will be given of prioritization and a power demand plan.

For example, the power plan unit 52 refers to the site information DB 33 to identify a power company used by each data center, and identifies electricity charges of the identified power company by referring to the power company DB 34. Next, the power plan unit 52 calculates the electricity charges for one day by using the identified electricity charges and the power usage of one day stored in the power use state DB 36 for each data center. For example, the power plan unit 52 calculates the basic price and the price at a metered rate, and calculates the total value of these as the fee for the power usage. The basic price is calculated by the basic unit price×the contracted power×the power factor. The price at a metered rate is calculated by multiplying the power usage of each time period and the unit price set for each time period. At this time, the power plan unit 52 may use the summer charge as the price at a metered rate when the summer charge is applicable.

The power plan unit 52 then prioritizes the calculated electricity charges (the basic price+the price at a metered rate) for one day of the respective data centers in ascending order and rearranges the information stored in the power use history DB 35 in the order of the electricity charges. The rearrangement is not limited to this method, and the power plan unit 52 may rearrange the information in ascending order of the basic prices of the respective data centers.

For example, the power plan unit 52 performs the future demand forecast on the power demand of each data center in consideration of a peak time on the basis of the current power usage and the past power usage. Specifically, the power plan unit 52 calculates the remaining power (surplus power) that is left until the power usage reaches the contracted power for each data center registered in the power use history DB 35 generated by the power plan unit 52. First, the power plan unit 52 sums up the power usage during nighttime, the power usage during daytime, and the power usage during peak time to calculate the power usage (today's power usage) of one day, subtracts the today's power usage from the contracted power to calculate the surplus power, and stores the surplus power in the power use history DB 35.

Next, the power plan unit 52 calculates the substitutable power, that is, power energy which may be used by each data center to import a VM guest. For example, the power plan unit 52 subtracts today's power usage from the contracted power to calculate the substitutable power. Some data centers reserve predetermined power (reserved power) in advance in preparation for a server start and the like in case of an emergency or in an urgent case. Accordingly, for such a data center, the power plan unit 52 may subtract the today's power usage and the reserved power from the contracted power to calculate the substitutable power.

The power plan unit 52 then extracts "today's power usage" stored in the power use history DB 35 as "forecast power usage" for each data center, and extracts "nighttime (00 to 08)", "daytime (08 to 13)", "peak time (13 to 16)", "daytime (16 to 22)", "nighttime (22 to 24)", and "contracted power" stored in the power use history DB 35, and stores these extracted items and the calculated substitutable power in the corresponding fields of in the power demand forecast DB 40 in association with one another. In this manner, it is possible to forecast the power demand in each data center and to identify the substitutable power in each data center.

Referring back to FIG. 2, the management unit 53 is a processing unit that periodically collects and manages information of the VMs running in each cloud, resource information of the data center that provides each cloud, network information regarding the network used by each data center, the latencies among the data centers, and the like.

For example, the management unit 53 obtains the resource information (vCPU (GHz), vCPU (the number of pieces), the memory (GB)) regarding resources used by a VM guest running in the cloud, and the lifetime, the operation time, and the deployment date to the cloud of the VM guest, from each cloud management server 10. The management unit 53 then stores the obtained information in the VM resource aggregate table for each VM in the VM resource management DB 37. Also, the management unit 53 stores the obtained information and the site code of the data center managed by the cloud management server 10 in the VM resource aggregate table for each DC in the VM resource management DB 37.

The management unit 53 multiplies the items of the resource information, that is to say, vCPU (GHz), vCPU (the number of pieces), and a memory (GB)) to calculate a resource load index for each VM guest. Also, the management unit 53 obtains the name of the region and the name of the zone in which each VM guest is running from each cloud management server 10. The management unit 53 then stores the region name, the zone name, the VM guest name, the deployment date, the resource information of the VM guest, the lifetime, the operation time, and the resource load index in the environmental load DB 39 in association with one another.

The management unit 53 obtains the total amount of resources of the respective data centers, and the amount of resources not to be migrated from each cloud management server 10. Also, the management unit 53 calculates an amount of free resources, which is obtained by subtracting the amount of resources not to be migrated and the amount of resources of the VM guest from the total amount of resources, for each data center. In general, it is possible to determine the free amount of resources to be the amount of substitutable resources, which is the amount of resources that the data center may use to import a VM guest. However, some data centers have to reserve a predetermined amount of resources (reserved amount of resources) in advance in preparation for activation of a VM guest in case of an emergency or in an urgent case. Accordingly, the management unit 53 may subtract the amount of resources not to be migrated, the amount of resources of the VM guest, and further the amount of reserved resources from the total amount of resources to calculate the amount of free resources for such data centers. The management unit 53 then stores the site code of the data center managed by the cloud management server 10, the amount of free resources, the amount of resources not to be migrated, and the amount of substitutable resources in the DC resource management DB 38 in association with one another.

The management unit 53 obtains band specifications of each data center (site) from each cloud management server 10. The management unit 53 then stores the site code and the band specifications in the band management DB 42 in association with each other.

The management unit 53 obtains the measurement result of the latencies between each data center (site) managed by each cloud management server 10 and other data centers from each cloud management server 10. The latency measurement result obtained here is the measurement result obtained in each time period, such as during midnight specified in advance, or the like, and includes the UTC offset between the measurement source and the measurement destination. The management unit 53 then stores "destination" indicating the data center of the measurement destination and the latency measurement result in the latency DB 41 in association with each other for each data center serving as the measurement source. Also, the management unit 53 prioritizes the records in the latency DB 41 in ascending order of the latency between the data centers. The prioritization is performed by comparing the average value of the latency measurement result.

Referring back to FIG. 2, the deployment unit 54 is a processing unit that determines, upon receiving a deployment request of a new VM guest from a cloud management server 10, a deployment destination and notifies the cloud management server 10 of the deployment destination. Specifically, the deployment unit 54 periodically checks the current power demand and the past history for each cloud and deploys the new VM guest so as not to exceed the contracted power in each cloud during the peak time and to meet the target amount of reduction.

For example, the deployment unit 54 receives a deployment request including resource information of the VM guest to be activated, the time period in which the VM guest is operated, and the operation time from the cloud management server 10. The deployment unit 54 then calculates the forecast power usage of the VM guest to be deployed, on the basis of the power usage per unit time set for vCPU and the memory in advance. The deployment unit 54 then refers to information regarding the data centers (site codes) stored in the power demand forecast DB 40 from the top, and transmits a response specifying a data center having the power during peak time lower than a threshold value, the substitutable power higher than the forecast power usage of the VM guest to be deployed, and capable of securing the amount of resources of the VM guest to be activated, as a deployment destination to the cloud management server 10. The cloud management server 10 transmits a deployment instruction of the VM guest to the data center specified in the response.

At this time, the deployment unit 54 may consider the latency. For example, the deployment unit 54 narrows down the data centers having a latency of less than or equal to a predetermined value with a data center managed by the cloud management server 10 that transmits the deployment request as candidates for the deployment destination. Then, the deployment unit 54 may select a data center having a substitutable power equal to or higher than the forecast power usage of the VM guest to be deployed as a deployment destination among the candidates for the deployment destination.

When the cloud management server 10 deploys the VM guest, the deployment unit 54 requests each cloud management server 10 to collect the resource information and the like, and transmits a collection instruction to the collection unit 51 and the management unit 53. As a result, the collection unit 51 and the management unit 53 collect various kinds of information from the cloud management servers 10 and update the various DBs.

Also, the deployment unit 54 may perform the deployment preferentially to a data center under the control of the cloud management server 10 that transmits the deployment request. In this case, when the forecast power usage exceeds the substitutable power of the data center, the deployment unit 54 may determine a cloud of the deployment destination using the above-described method.

Figure 14:
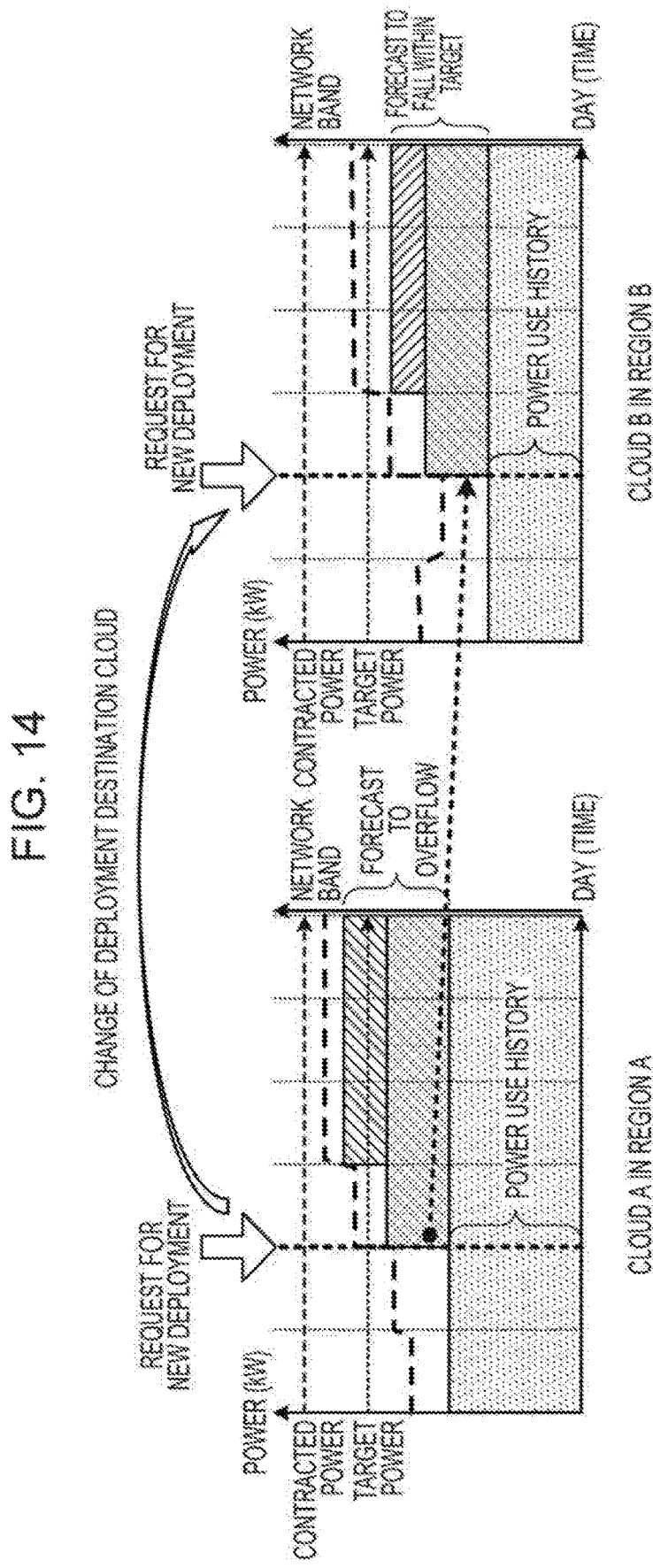
FIG. 14 is a diagram illustrating control at the time of deploying a VM guest.

FIG. 14 is a diagram illustrating control at the time of deploying a VM guest. In FIG. 14, a description will be given with an example in which a data center in a cloud A in a region A transmits a deployment request of a VM guest. As illustrated in the left diagram in FIG. 14, the master controller 30 determines that there is remaining power in the cloud A in the region A at the time of new deployment, but the power usage will exceed the target power in a few hours if the new VM guest is activated, by referring to the past history. On the other hand, as illustrated in the right diagram in FIG. 14, the master controller 30 determines that the power usage will not exceed the target power in a cloud B in a region B even if the new VM guest is activated, by referring to the past history. In such a case, the deployment unit 54 transmits an instruction to the cloud management server 10 in order to change the deployment destination to the cloud B in the region B instead of the cloud A in the region A, which is the request source of the new deployment. The target power is the upper limit value of the power use set for a data center and may be the same as the contracted power.

The migration plan unit 55 is a processing unit that generates a migration plan of each VM on the basis of the charge information of each cloud and the lifetime of each VM. Specifically, the migration plan unit 55 periodically refers to each DB and generates a migration plan for migrating a VM having a relatively long lifetime to a cloud having relatively low electricity charges, and migrating a VM having a relatively short lifetime to a cloud having relatively high electricity charges.

In more detail, when the migration plan unit 55 determines a migration from a cloud A having a high power cost to a cloud B having a low power cost, the migration plan unit 55 determines a VM guest to be migrated by classifying VM guests on the basis of the lifetime and the amount of resources thereof as follows: (1) the lifetime is shorter than a threshold (lifetime threshold) predetermined for the lifetime and the amount of resources is smaller than a threshold (resource threshold) predetermined for the amount of resources; (2) the lifetime is shorter than the lifetime threshold and the amount of resources is larger than the resource threshold; (3) the lifetime is longer than the lifetime threshold and the amount of resources is smaller than the resource threshold; and (4) the lifetime is longer than the lifetime threshold and the amount of resources is larger than the resource threshold. Here, a VM guest having a shorter lifetime is determined to have lower environmental load, and a VM guest having a smaller amount of resources is determined to have lower environmental load. VM guests are frequently created and deleted in a cloud, and a VM guest having a short lifetime is likely to be deleted. That is to say, a VM guest having a longer lifetime and a larger amount of resources is determined to be more advantageously migrated to a cloud having a low cost.

Figure 15:
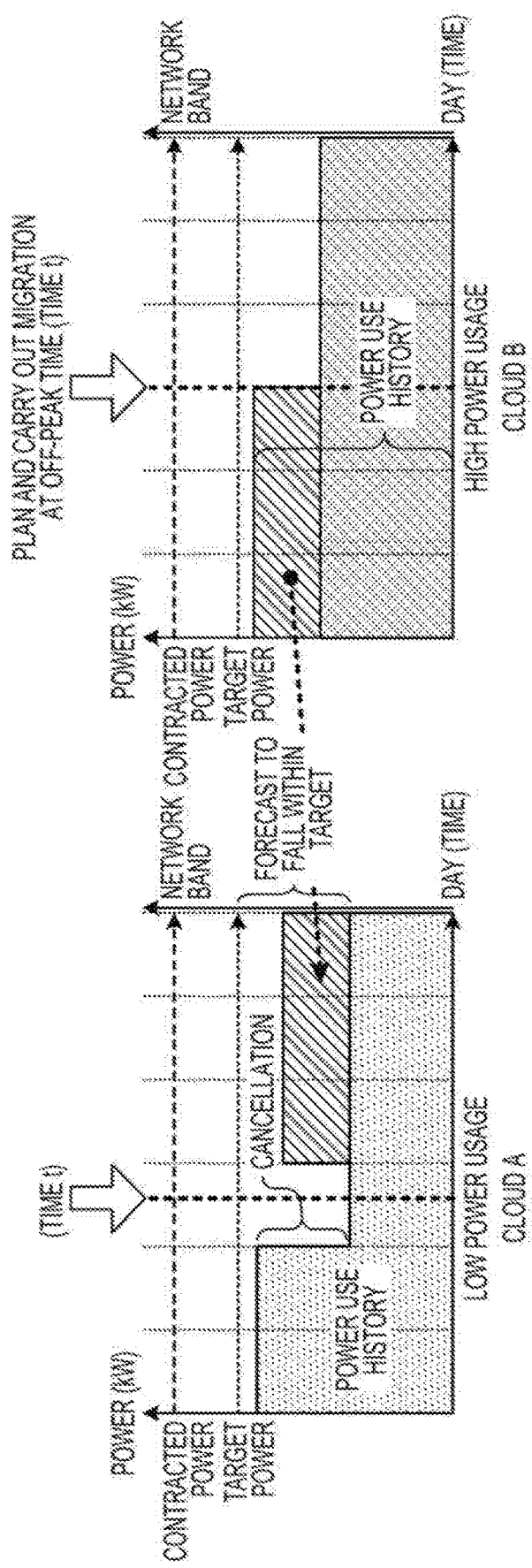
FIG. 15 is a diagram illustrating a periodic migration plan of a VM guest.

FIG. 15 is a diagram illustrating a periodic migration plan of a VM guest. In FIG. 15, it is assumed that the electricity charges (basic price) of a data center in the cloud A in the region A is lower than the electricity charges (basic price) of a data center in the cloud B in the region B. As illustrated in the left diagram in FIG. 15, in the cloud A, a contract of a VM guest is canceled or the like at a point in time (t) when a migration plan is created or reviewed so that the resources are released and the power usage is reduced. On the other hand, as illustrated in the right diagram in FIG. 15, in the cloud B, a VM guest continues to run at a point in time (t) when a migration plan is created or reviewed and the power usage is kept high. In such a case, the master controller 30 creates a plan for migrating a VM guest running in the cloud B having high electricity charges to the cloud A having low electricity charges.

As a migration plan, a method of checking a VM guest one by one is considered. However, a description will be given of a method of grouping VM guests here. First, the migration plan unit 55 refers to the contracted power in the power use history DB 35 and the basic unit price, the metered rate, and the like in the power company DB 34 to calculate the basic price which is the power cost for each data center. The migration plan unit 55 then sorts the data centers in ascending order of the basic price.

Next, the migration plan unit 55 refers to the environmental load DB 39 to obtain the lifetime, the resource information, and the resource load index of the respective VM guests running in the wide-area cloud. The migration plan unit 55 then classifies the VM guests into the same number of groups as the number of data centers on the basis of the lifetime and the resources load index. The migration plan unit 55 classifies the VM guests in descending order of "lifetime×resource load index" in consideration of (1) to (4) described above. For example, the migration plan unit 55 classifies VM guests having a lifetime equal to or longer than a first threshold value and a resource load index equal to or higher than a second threshold value into a first group, classifies VM guests having a lifetime equal to or longer than the first threshold value and a resource load index lower than the second threshold value into a second group, and classifies VM guests having a lifetime shorter than the first threshold value and a resource load index equal to or higher than the second threshold value into a third group, and the like. The number of groups is any number. If there are eight data centers, the threshold values and the like may be adjusted so as to classify the VM guests into eight groups or into a smaller number of groups than the number of data centers.

Here, a description will be given of an example of grouping. The migration plan unit 55 extracts the amount of substitutable resources in a data center (DC001) assigned to a group 1 from the DC resource management DB 38. Next, the migration plan unit 55 selects VM guests in descending order of "lifetime×resources load index" and classifies them into the group 1. At this time, the migration plan unit 55 obtains the resource information of the VM guests to be selected from the environmental load DB 39 and selects VM guests to the extent that the total amount of resources used by the selected VM guests does not exceed the amount of substitutable resources of the data center (DC001) and classifies the selected VM guests into the group 1. Next, the migration plan unit 55 selects VM guests in descending order of "lifetime×resource load index" among the not-yet-selected VM guests and generates a group 2 by a similar method.

The latency may be considered at the time of grouping. For example, when the migration plan unit 55 classifies a VM guest (VM005) into the group 1 and determines to migrate the VM guest (VM005) to the data center (DC001) assigned to the group 1, the migration plan unit 55 obtains the latency between the data center on which the VM guest (VM005) is running and the data center (DC001) serving as a migration destination from the latency DB 41. If the latency is equal to or higher than a threshold value, the migration plan unit 55 then inhibits the VM guest (VM005) to be classified into the group 1 and considers classifying the VM guest (VM005) into the group 2. Also at this time, the classification is determined in consideration of the latency.

In this manner, the migration plan unit 55 assigns in sequence from the group 1 having a long lifetime and a high load to a data center having low electricity charges. For example, the migration plan unit 55 assigns the group 1 to the data center (DC001) having the lowest electricity charges, and assigns the group 2 to the data center (DC002) having the next lowest electricity charges. The migration plan unit 55 then generates a migration plan for each VM and stores the migration plan in the migration plan DB 43. The migration scheduled date or the like is selected as the date having the lowest data traffic in the entire wide-area cloud or the like such that the services in operation are not significantly affected.

The plan execution unit 56 is a processing unit that performs a migration plan stored in the migration plan DB 43. For example, the plan execution unit 56 monitors a migration plan stored in the migration plan DB 43, and if the plan execution unit 56 detects a plan that reaches the migration scheduled date, the plan execution unit 56 carries out the plan. Specifically, the plan execution unit 56 instructs the cloud management server 10 that manages the data center (site) in which the VM guest to be migrated is running to migrate the VM guest. The migration may be a live migration or a cold migration, and the cloud management server 10 suitably select and carry out a migration depending on the state.

FIG. 16 is a diagram illustrating a migration plan of a VM guest in consideration of electricity charges. Here, a description will be given of an example in which one cloud is operated in one data center, six clouds (data centers) are located, and a plan of dividing VM guests into four groups is carried out by the following criteria. Here, it is assumed that in group (4): the lifetime is equal to or longer than a first threshold value and the resource load index is equal to or higher than a second threshold value, in group (3): the lifetime is equal to or longer than the first threshold value and the resource load index is lower than the second threshold value, in group (2): the lifetime is shorter than the first threshold value and the resource load index is equal to or higher than the second threshold value, and in group (1): the lifetime is shorter than the first threshold value and the resource load index is lower than the second threshold value. It is also assumed that there are data centers A, B, C, D, E, and F in order of lower electricity charges. In FIG. 16, the resources not allowed to be migrated is denoted as "fixed", and free resources are denoted as "free".

In such a state, the migration plan unit 55 classifies each VM guest running in each data center into the above-described (1) to (4) (the middle diagram in FIG. 16). After that, a migration plan is generated such that VM guests classified into (4) are put together to the cloud A in the data center A, VM guests classified into (3) are put together to the cloud B in the data center B, VM guests classified into (2) are put together to the cloud C in the data center C, and VM guests classified into (1) are put together to the cloud D in the data center D. The plan execution unit 56 then carries out the migration plan such that VM guests are put together in descending order of lifetime and load starting with the data center A (the lower diagram in FIG. 16). In FIG. 16, the reason why VM guests other than (4) are running in the data center A is that, for example, there are VM guests that are not migrated because the latency fails to meet the service level agreement (SLA) of a customer due to the migration, or the like.

Next, a description will be given of the process performed by the system illustrated in FIG. 1. Here, a description will be given of a general flow of the process, and the power demand planning process and the deployment and migration planning process performed by the master controller 30.

Figure 17:
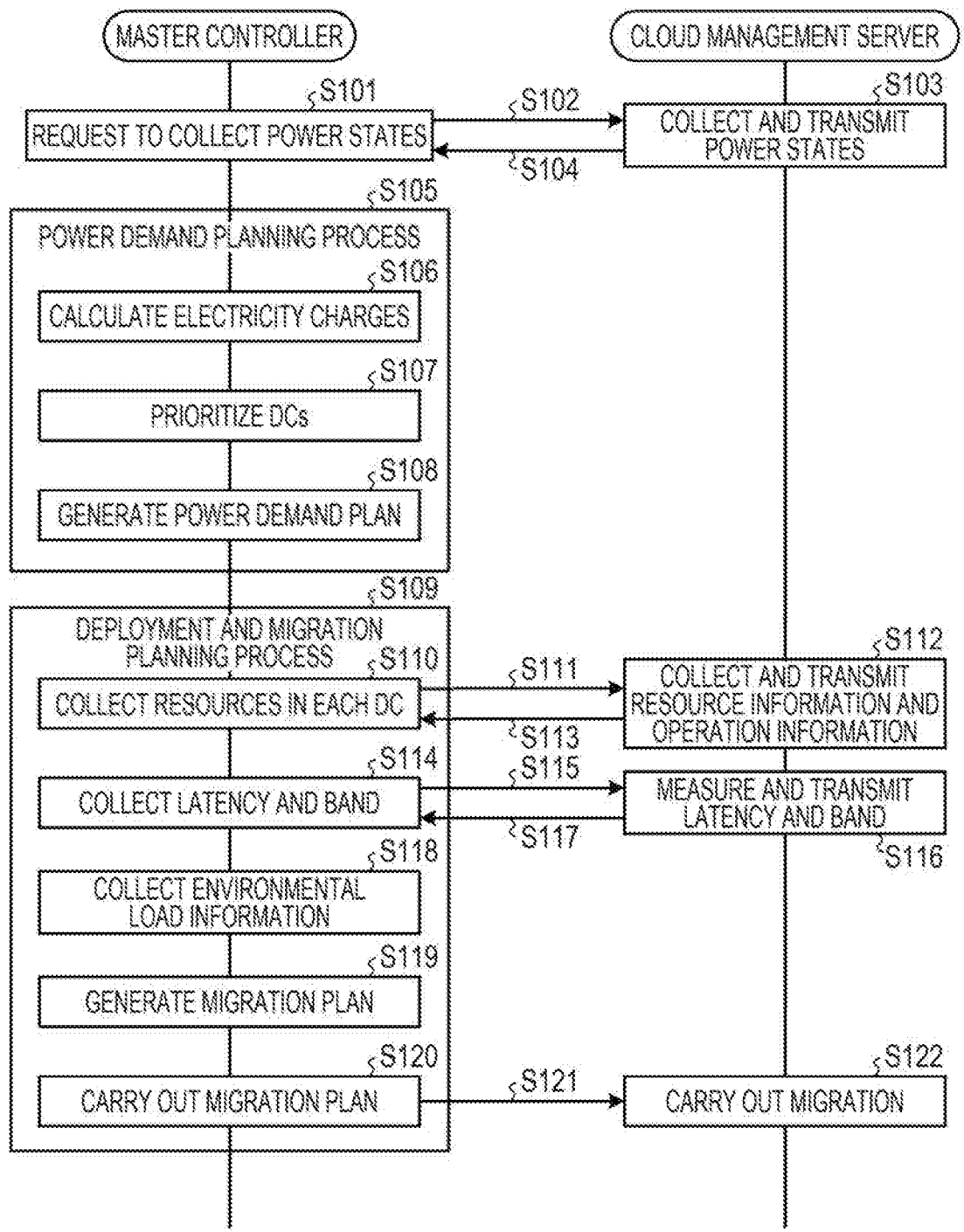
FIG. 17 is a sequence chart illustrating a flow of an entire process.

FIG. 17 is a sequence chart illustrating a flow of an entire process. As illustrated in FIG. 17, the master controller 30 transmits a request for collecting the power state to each cloud management server 10 (S101 and S102). Each cloud management server 10 collects the power states of the data centers under the control thereof and transmits the power states to the master controller 30 (S103 and S104).

Next, the master controller 30 performs power demand plan process for each data center (S105). Specifically, the master controller 30 calculates the electricity charges of each data center (S106), prioritizes the data centers in ascending order of the electricity charges (S107), and generates a power demand plan (S108).

After that, the master controller 30 performs the deployment and migration planning process (S109). Specifically, the master controller 30 collects information regarding the resources in each data center (from S110 to S113). For example, the master controller 30 transmits a request to each cloud management server 10, each cloud management server 10 collects the resource information of the data centers under the control thereof and the operation information of the VM guests running in the data center, and transmits the information to the master controller 30.

Next, the master controller 30 collects information regarding the latency and the band for each data center (from S114 to S117). For example, the master controller 30 transmits a request to the each cloud management server 10, and each cloud management server 10 measures the latency between the data center under the control thereof and other data centers and transmits the measurement result and the band specifications contracted by the data center to the master controller 30.

After that, the master controller 30 collects the environmental load information (S118), generates a migration plan (S119), and carries out the generated migration plan (S120 and S121). With this, the cloud management server 10 performs migration of the VM guest (S122).

Figure 18:
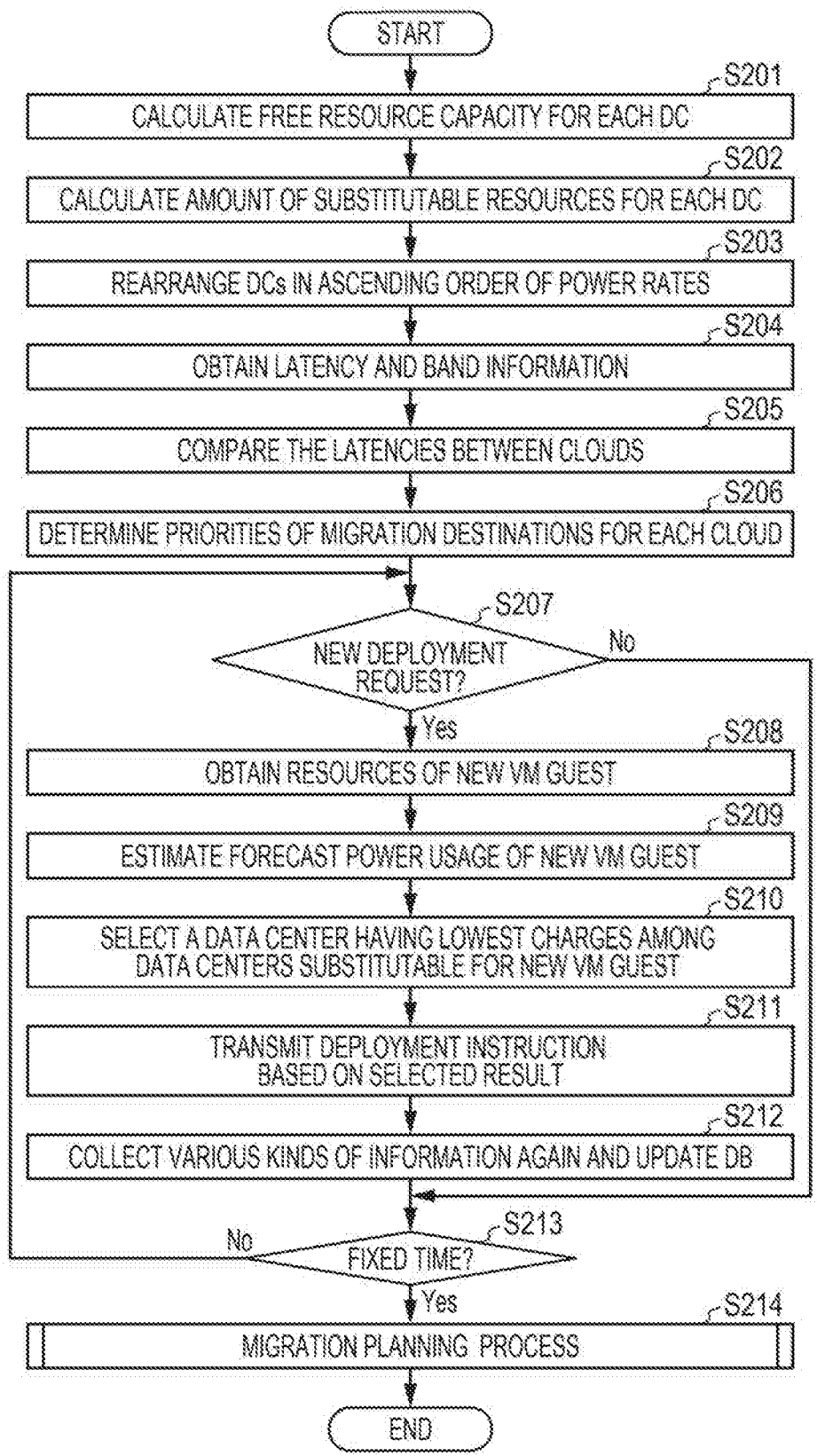
FIG. 18 is a flowchart illustrating a flow of a deployment and migration planning process.

FIG. 18 is a flowchart illustrating a flow of the deployment and migration planning process. As illustrated in FIG. 18, the power plan unit 52 calculates the free resource capacity for each data center (S201), and calculates the amount of substitutable resources for each data center (S202). Next, the power plan unit 52 rearranges the respective data centers stored in the power use history DB 35 in ascending order of the electricity charges (S203).

Also, the power plan unit 52 obtains the information regarding the latency and the band obtained by the management unit 53 (S204) and compares the latencies between the clouds, that is to say, between the data centers (S205). The power plan unit 52 then determines the priority of the migration destination for each cloud (S206).

After that, when the deployment unit 54 receives a deployment request of a new VM guest (S207: Yes), the deployment unit 54 obtains information regarding the resources of the new VM guest from the cloud management server 10 (S208) and estimates forecast power usage of the new VM guest (S209).

The deployment unit 54 then selects a data center having the lowest electricity charges among the data centers capable of securing the amount of resources equal to or larger than that of the new VM guest (S210). Next, the deployment unit 54 transmits a deployment instruction to the cloud management server 10 on the basis of the selected result (S211). After that, the management unit 53, the collection unit 51, and the like recollect various kinds of information, such as the resources, the operation information, and the like to update the DBs (S212).

After that, when the fixed time comes (S213: Yes), the migration planning process is performed (S214). On the other hand, when the fixed time does not come (S213: No), S207 and thereafter are performed. If a fixed time comes while a new deployment request is waited, the migration planning process is performed. When the deployment unit 54 does not receive a deployment request of a new VM guest (S207: No), S213 is performed.

Figure 19:
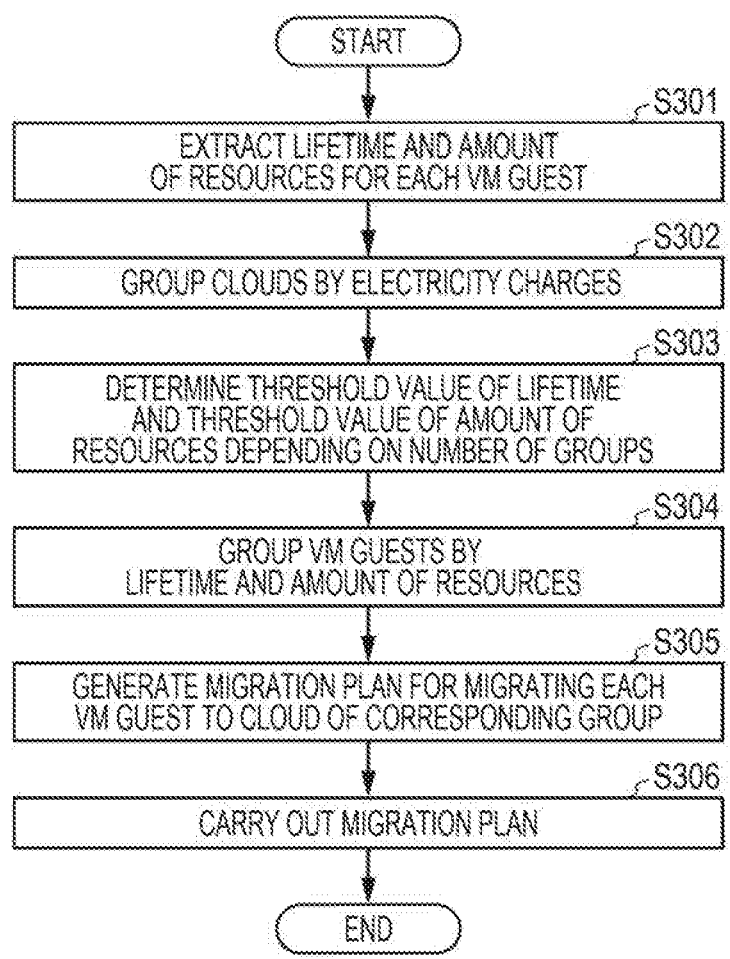
FIG. 19 is a flowchart illustrating a flow of a migration planning process.

FIG. 19 is a flowchart illustrating a flow of the migration planning process. As illustrated in FIG. 19, the migration plan unit 55 extracts the lifetime and the amount of resources for each VM guest (S301), and groups the clouds (data centers) by the electricity charges (S302). For example, the migration plan unit 55 classifies the data centers having the same electricity charges into the same group.

The migration plan unit 55 then determines a threshold value of the lifetime and a threshold value of the amount of resources depending on the number of groups (S303), and groups the VM guests by the lifetime and the amount of resources (S304).

Next, the migration plan unit 55 generates a migration plan for migrating a VM guest having a long lifetime and the large amount of resources to a data center having low electricity charges (S305). After that, the plan execution unit 56 carries out the migration plan (S306).

As described above, the master controller 30 conducts across-the-board management of the electricity charges, the power usage, and the information of the VM guests for each of the data centers (clouds) that are scattered around the world, and reduces the fee for power usage in all the clouds and carries out an optimal VM deployment and migration so that it is possible to perform cloud operation without having disproportion in the operation rates.

the master controller 30 may predict the peak on the basis of the past power demand and the current state and control the number of servers running in the clouds so as not to exceed the contracted power and to migrate a VM guest on a server. Also, the master controller 30 may periodically measure the lifetime and the network response (latency) at the time of migrating a VM guest between the clouds, to reflect them on a migration plan so as to avoid the concentration on the lowest-price cloud and to reduce the influence of the migration on users.

In this manner, the master controller 30 may control the power usage and the use states of the clouds scattered around the world so as to realize the reduction and the optimization of the power demand of the overall the clouds. Further, a cloud provider may reduce the system maintenance cost by the power reduction. As a result, the cloud provider may get an advantage over other providers in the competition by reflecting the reduction of the system maintenance cost on the usage charge to the users, that is to say, lowering the price.

Second Embodiment

In the first embodiment, a description has been given of the example in which VM guests having a high load are concentrated in a data center (cloud) having low electricity charges. However, the present disclosure is not limited to this, and the relocation may be performed after the concentration.

For example, if a cloud having low electricity charges is congested and a cloud having high electricity charges becomes vacant after carrying out migration according to the first embodiment, the clouds may be ineffectively used. Thus, in a second embodiment, actual operation time is measured, VM guests having a little operation time are periodically extracted on the basis of the distribution of the operation rate per day, and migration of the extracted VM guests to a cloud having high electricity charges is carried out. That is to say, a VM guest having a low operation rate, in other words, having low power consumption is migrated to a cloud having high electricity charges, and a VM guest having a high operation rate, in other words, having high power consumption is migrated to a cloud having low electricity charges.

Figure 20:
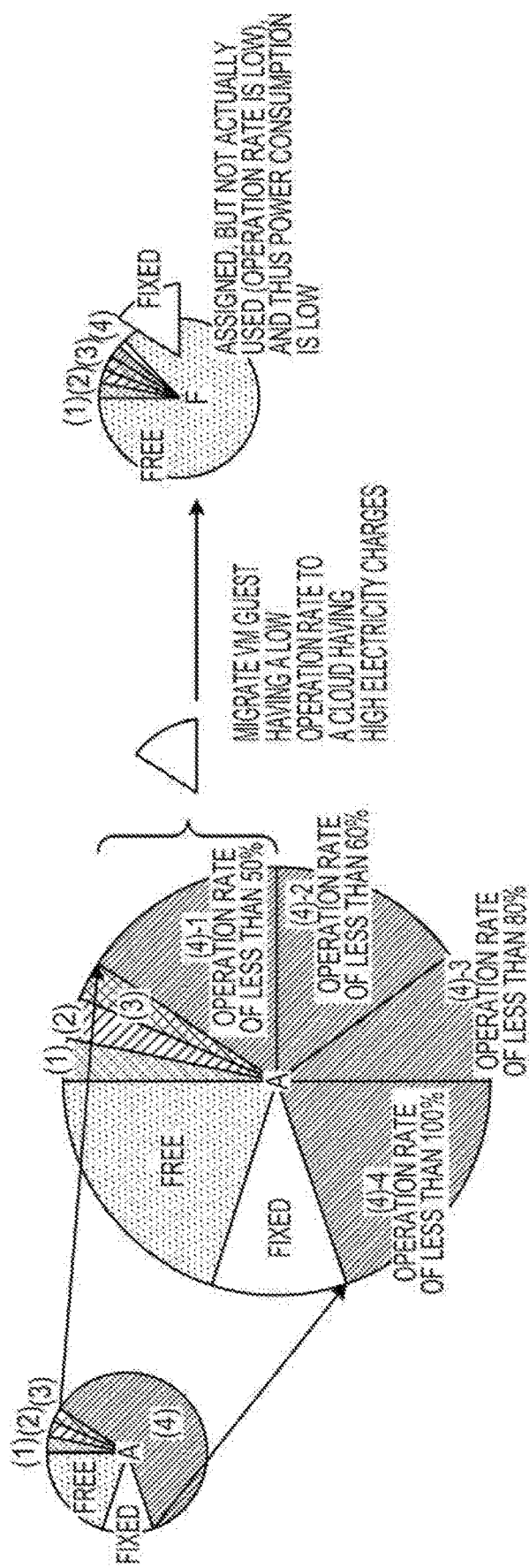
FIG. 20 is a diagram illustrating a relocation plan.

FIG. 20 is a diagram illustrating a relocation plan. FIG. 20 corresponds to the cloud A after carrying out the migration plan illustrated in FIG. 16. As illustrated in FIG. 20, the migration plan unit 55 extracts the lifetime and the operation time of each VM guest which is running in the cloud A and falls in the category of "(4): the lifetime is equal to or longer than the first threshold value and the resource load index is equal to or higher than the second threshold value" from the VM resource management DB 37. The migration plan unit 55 then calculates an operation rate (=(operation time/lifetime)×100) for each VM guest. The migration plan unit 55 then migrates VM guests having the operation rate of less than 50% among the VM guests that fall into the category of (4) to the cloud F having high electricity charges. The setting of the threshold value of the operation rate may be changed to any setting.

Figure 21:
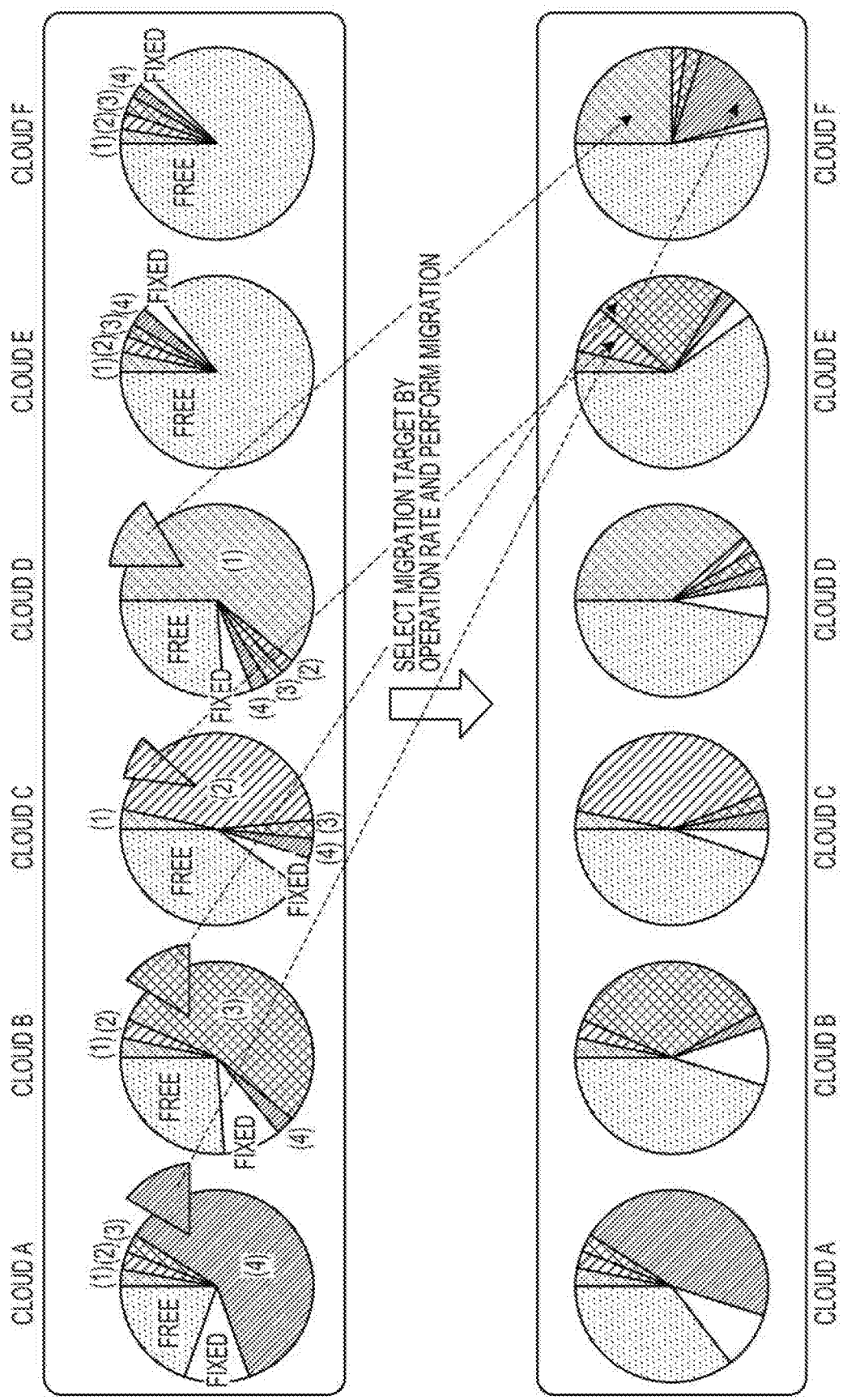
FIG. 21 is a diagram illustrating a specific example of before and after relocation.

After a predetermined period of time elapses from when the migration plan unit 55 carries out the migration plan described in the first embodiment, the migration plan unit 55 carries out the relocation illustrated in FIG. 20. FIG. 21 is a diagram illustrating a specific example of before and after the relocation. The upper diagram in FIG. 21 is a diagram after the migration plan illustrated in FIG. 16 is carried out (the lower diagram in FIG. 16). As illustrated in FIG. 21, the migration plan unit 55 calculates the operation rate of each VM guest running in the clouds A to D to which VM guests are concentrated after carrying out the migration, and extracts VM guests having the operation rate of less than 50%. The migration plan unit 55 then migrates the VM guests having the operation rate of less than 50% in the clouds A to D to the cloud E or F having high electricity charges. Whether to migrate the VM guests to the cloud E or F may be determined in any way.

Specifically, the migration plan unit 55 migrates VM guests having the operation rate of less than 50% out of the VM guests that fall within the category of (4) in the cloud A to the cloud F. The migration plan unit 55 migrates VM guests having the operation rate of less than 50% out of the VM guests that fall within the category of (3) in the cloud B to the cloud E. The migration plan unit 55 migrates VM guests having the operation rate of less than 50% out of the VM guests that fall within the category of (2) in the cloud to the cloud E. The migration plan unit 55 migrates VM guests having the operation rate of less than 50% out of the VM guests that fall within the category of (1) in the cloud D to the cloud F.

In this manner, the operation rate of a cloud having low electricity charges may increase, and a cloud having high electricity charges may be effectively used.

Other Embodiments

The descriptions have been given of the embodiments of the present disclosure so far. However, the present disclosure may be implemented in various different modes other the embodiments described above.

In the first embodiment, a description has been given of an example in which the master controller 30 deploys a new VM guest to a cloud having low electricity charges. However, the present disclosure is not limited to this. For example, if a cloud having the lowest electricity charges does not have sufficient free resources, the master controller 30 deploys the new VM guest to the cloud managed by the cloud management server 10 which requests the deployment.

Figure 22:
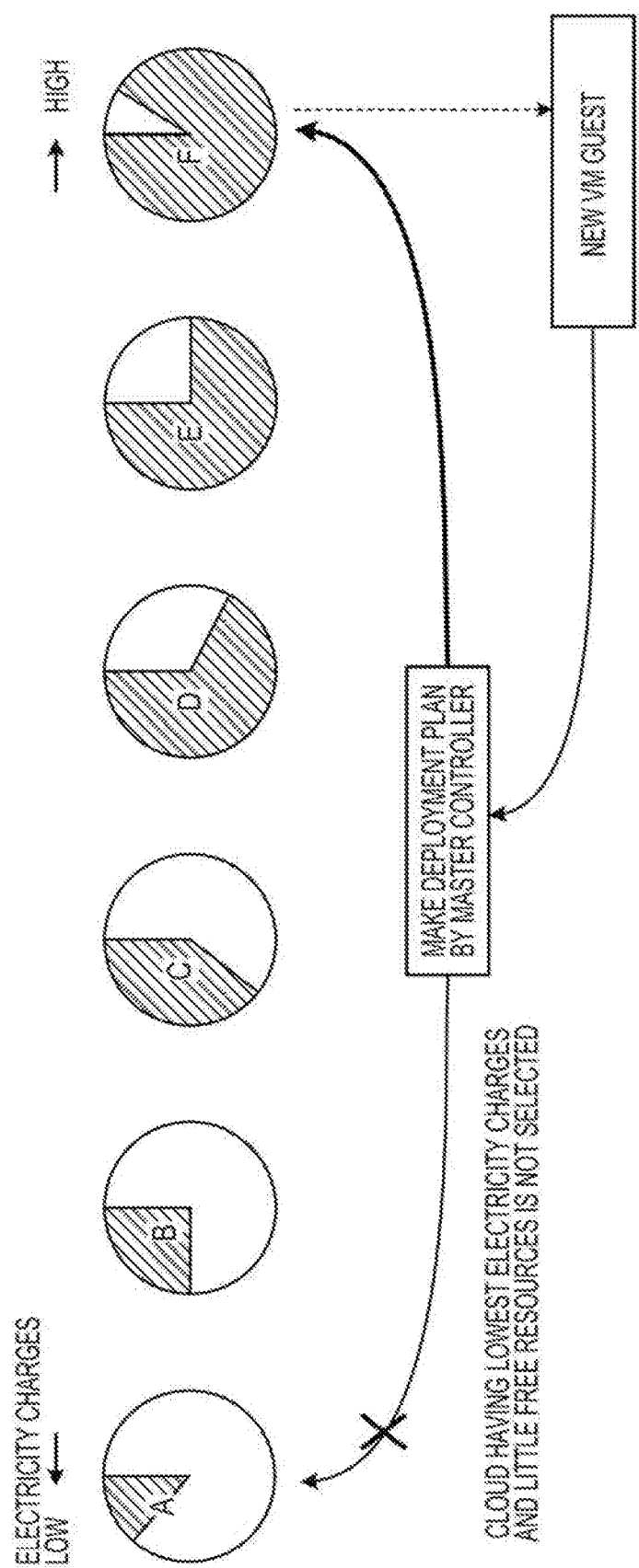
FIG. 22 is a diagram illustrating an example of control of initial deployment.

FIG. 22 is a diagram illustrating an exemplary control of initial deployment. As illustrated in FIG. 22, when the master controller 30 receives a deployment request of a new VM guest from the cloud management server 10 that manages the cloud F having the maximum electricity charges, the master controller 30 obtains information regarding the amount of substitutable resources of the cloud A having the lowest electricity charges. If the amount of substitutable resources of the cloud A having the lowest electricity charges is smaller than a threshold value, the master controller 30 then notifies the cloud management server 10 of the deployment to the cloud F. In this manner, the deterioration of the performance of the cloud having the lowest electricity charges may be reduced.

In the above-described embodiments, a description has been given of the example in which seasonal charge, such as summer charge or the like is used. However, the present disclosure is not limited to this, and the seasons or the like may be considered. For example, the master controller 30 may consider the seasons of all over the world, and may concentrate VM guests having the high operation rate or the like to a data center in a country in a season having low electricity charges.

Also, the master controller 30 may manage narrow-area clouds, which constitute a wide-area cloud, in units of region and to perform migration of a VM guest and the like. For example, the master controller 30 may collectively manage a plurality of clouds located in Japan. If the electricity charges are high in summer in Japan, it is possible to migrate, only during summer in Japan, the VM guests that fall within the category of the above-described (4) or the like out of the respective VM guests running in the clouds in Japan to other clouds located in other places that are in winter during the same period.

Also, if the electricity charges are high during daytime in Japan, the master controller 30 may migrate the VM guests that fall in the category of the above-described (4) or the like among the VM guests running in the clouds in Japan to other clouds located in other places that are at night in a time period while Japan is in the daytime. In this manner, the electricity charges of the entire cloud may be lowered, and thus widespread use of clouds and attraction of VM guest users may be expected. When a migration destination is determined, it is possible to perform control so as not to migrate a VM guest to a country, a region, or the like, to which export is not allowed, in consideration of the export restrictions or the like for each VM guest.

In the first embodiment, the lifetime of a VM guest is used. However, the present disclosure is not limited to this. For example, any information indicating that a VM guest is running may be used, and, for example, the operation time may be employed. In each of the embodiments, descriptions have been given of the example in which the lifetime and the resource information are used. However, the processes may be performed using only the lifetime. For example, a VM guest having a relatively long lifetime may be migrated to a cloud having low electricity charges.

Figure 23:
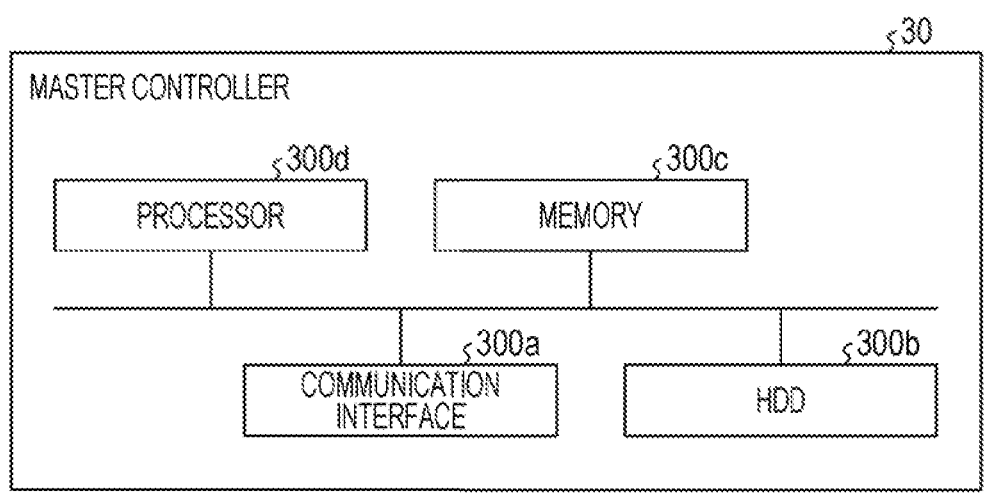
FIG. 23 is a diagram illustrating an exemplary hardware configuration of a master controller.

The master controller 30 and each of the cloud management servers 10 have a similar hardware configuration, and thus a description will be given here of the master controller 30. FIG. 23 is a diagram illustrating an exemplary hardware configuration of the master controller 30. As illustrated in FIG. 23, the master controller 30 includes a communication interface 300a, a hard disk drive (HDD) 300b, a memory 300c, and a processor 300d such as a central processing unit (CPU) or the like. Each unit illustrated in FIG. 23 is mutually coupled via a bus or the like.

The communication interface 300a is a network interface card or the like. The HDD 300b stores therein programs and the tables for implementing the functions illustrated in FIG. 2.

The processor 300d reads the programs for implementing the process of each processing unit illustrated in FIG. 2 from the HDD 300b or the like and loads them in the memory 300c so as to perform the process that implements each of the functions described in FIG. 2 and the like. That is to say, the process performs the functions of each processing unit of the master controller 30. Specifically, the processor 300d reads the programs having the functions as those of the collection unit 51, the power plan unit 52, the management unit 53, the deployment unit 54, the migration plan unit 55, the plan execution unit 56, and the like from the HDD 300b or the like. The processor 300d then performs the processes for implementing functions of the collection unit 51, the power plan unit 52, the management unit 53, the deployment unit 54, the migration plan unit 55, the plan execution unit 56, and the like by executing the programs.

In this manner, the master controller 30 reads and executes the programs so as to operate as an information processing apparatus that performs the cloud management method. Also, the master controller 30 may cause a medium reading device to read the above-described programs from a recording medium and execute the read programs so as to realize the functions as those of the embodiments described above. The programs in the other embodiments are not limited to the programs executed by the master controller 30. For example, the present disclosure may be applied in the same manner when another computer or server executes the programs, or when these computer and server execute the programs in collaboration with each other.

Out of each process described in the embodiments, all of or a part of the process that is described to be automatically performed may be manually performed. Alternatively, all of or a part of the process that is described to be manually performed may be automatically performed. In addition, it is possible to change the processing procedure, the control procedure, and the information including the specific names, various kinds of data, and the parameters that are described in the above-described documents and illustrated in the diagrams in any way if not otherwise specified.

Also, each component of each unit illustrated in the diagrams is functional and conceptual, and does not have to be physically configured as illustrated in the diagrams. That is to say, the specific mode of distribution and integration of each unit are not limited to those illustrated in the diagrams. That is to say, it is possible to functionally or physically configure each unit by distributing or integrating all of or a part of each unit in any units in accordance with the various loads, the use state, and the like. Further, it is possible to realize all of or any part of each processing function performed in each unit by a CPU and by the programs that is analyzed and executed by the CPU, or by wired-logic hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory, the processor configured to periodically:
collect power states including use history of electric power for running a virtual machine in respective cloud services provided by a plurality of data centers arranged in different regions;
calculate, based on the collected power states, an electricity charge for each data center of the plurality of data centers;
generate a power demand plan, based on the calculated electricity charges of the plurality of data centers, that ranks the plurality of data centers in an ascending order of electricity charge per data center;
obtain operation information comprising resource availability of the plurality of data centers on which virtual machines are running in the respective cloud services;
compare an expected lifetime of each of the virtual machines to a threshold to generate comparison results;
classify the virtual machines in descending order based on the comparison result and a resource load index of the virtual machine;
assign each of the classified virtual machines into at least a first and a second group based on the comparison results and the resource load index of each virtual machine;
generate a migration plan, based on the power demand plan, the operation information, and according to the assigned groups, for migrating the grouped virtual machines so that a total electricity charge of the plurality of data centers decreases; and
migrate a first group of virtual machines having a long lifetime and a high resource load index to a first cloud service provided on ranked data centers having low electricity charges, and migrate a second group of virtual machines having a shorter lifetime and a low resource load index to a second cloud service provided on ranked data centers having higher electricity charges than the first cloud service in accordance with the migration plan.

2. The information processing apparatus according to claim 1, wherein the processor is further configured to:
obtain information regarding a lifetime as the operation information of the virtual machines, the lifetime being a time elapsed since deployment of a relevant virtual machine in a relevant cloud service;
compare the lifetimes of the virtual machines with a predetermined first threshold; and
generate the migration plan for:
migrating virtual machines having a lifetime equal to or longer than the predetermined first threshold to a first cloud service, and
migrating virtual machines having a lifetime shorter than the predetermined first threshold to a second cloud service, the second cloud service having electricity charges higher than electricity charges of the first cloud service.

3. The information processing apparatus according to claim 2, wherein the processor is further configured to generate the migration plan for migrating virtual machines having a lifetime equal to or longer than the predetermined first threshold and having resources equal to or larger than the predetermined second threshold, among virtual machines running in the first cloud service, to the second cloud service in a season or a time period in which electricity charges of the first cloud service are higher than electricity charges of the second cloud service.

4. The information processing apparatus according to claim 2, wherein the processor is further configured to:
  calculate an operation rate of the virtual machines after an elapse of a predetermined time period after the migration plan is carried out; and
  migrate virtual machines having an operation rate less than a predetermined second threshold, among the virtual machines migrated to the first cloud service, to a third cloud service having electricity charges higher than the electricity charges of the first cloud service.

5. The information processing apparatus according to claim 1, wherein the processor is further configured to:
  acquire, when a request for deploying a new virtual machine is received from a region of the different regions, a first amount of resources of the new virtual machine from a management server located in the region;
  estimate a forecast power usage of the new virtual machine based on the first amount of resources;
  select a data center having the lowest electricity charges among data centers capable of securing a second amount of resources equal to or larger than the first amount of resources of the new virtual machine based on the calculated electricity charge for each of the plurality of data centers; and
  transmit, to the management server, a deployment instruction for deploying the new virtual machine to the selected data center.

6. The information processing apparatus according to claim 1, wherein the processor is further configured to:
  calculate an operation rate of each of the virtual machines; and
  extract, after migration of the at least one virtual machine, a virtual machine having an operation rate lower than a predetermined threshold.

7. An information processing method, comprising:
  collecting power states including use history of electric power for running of a virtual machine in respective cloud services provided by a plurality of data centers arranged in different regions;
  calculating, based on the collected power states, an electricity charge for each data center of the plurality of data centers;
  generating a power demand plan, based on the calculated electricity charges of the plurality of data centers, that ranks the plurality of data centers in an ascending order of electricity charge per data center;
  obtaining operation information comprising resource availability of the plurality of data centers on which virtual machines are running in the respective cloud services;
  comparing an expected lifetime of each of the virtual machines to a threshold to generate comparison results;
  classifying the virtual machines in descending order based on the comparison result and a resource load index of the virtual machine;
  assigning each of the classified virtual machines into at least a first and a second group based on the comparison results and the resource load index of each virtual machine;
  generating a migration plan, based on the power demand plan, the operation information, and according to the assigned groups, for migrating the grouped virtual machines so that a total electricity charge of the plurality of data centers decreases; and
  migrating a first group of virtual machines having a long lifetime and a high resource load index to a first cloud service provided on ranked data centers having low electricity charges, and migrating a second group of virtual machines having a shorter lifetime and a low resource load index to a second cloud service provided on ranked data centers having higher electricity charges than the first cloud service in accordance with the migration plan; and
  wherein the method is performed periodically.

8. The information processing method according to claim 7, further comprising:
  calculating an operation rate of each of the virtual machines; and
  extracting, after migration of the at least one virtual machine, a virtual machine having an operation rate lower than a predetermined threshold.

9. A non-transitory computer readable medium storing computer executable instructions which, when executed by a processor, cause the processor to periodically:
  collect power states including use history of electric power for running a virtual machine in respective cloud services provided by a plurality of data centers arranged in different regions;
  calculate, based on the collected power states, an electricity charge for each data center of the plurality of data centers;
  generate a power demand plan, based on the calculated electricity charges of the plurality of data centers, that ranks the plurality of data centers in an ascending order of electricity charge per data center;
  obtain operation information comprising resource availability of the plurality of data centers on which virtual machines are running in the respective cloud services;
  compare an expected lifetime of each of the virtual machines to a threshold to generate comparison results;
  classify the virtual machines in descending order based on the comparison result and a resource load index of the virtual machine;
  assign each of the classified virtual machines into at least a first and a second group based on the comparison results and the resource load index of each virtual machine;
  generate a migration plan, based on the power demand plan, the operation information, and according to the assigned groups, for migrating the grouped virtual machines so that a total electricity charge of the plurality of data centers decreases; and
  migrate a first group of virtual machines having a long lifetime and a high resource load index to a first cloud service provided on ranked data centers having low electricity charges, and migrate a second group of virtual machines having a shorter lifetime and a low resource load index to a second cloud service provided on ranked data centers having higher electricity charges than the first cloud service in accordance with the migration plan.

10. The non-transitory computer readable medium according to claim 9, wherein the processor is further caused to:
  calculate an operation rate of each of the virtual machines; and extract, after migration of the at least one virtual machine, a virtual machine having an operation rate lower than a predetermined threshold.

\* \* \* \* \*